March 19, 1940.  R. F. DIRKES ET AL  2,193,809
SIGNALING SYSTEM AND APPARATUS THEREFOR
Original Filed Nov. 25, 1935  10 Sheets-Sheet 4
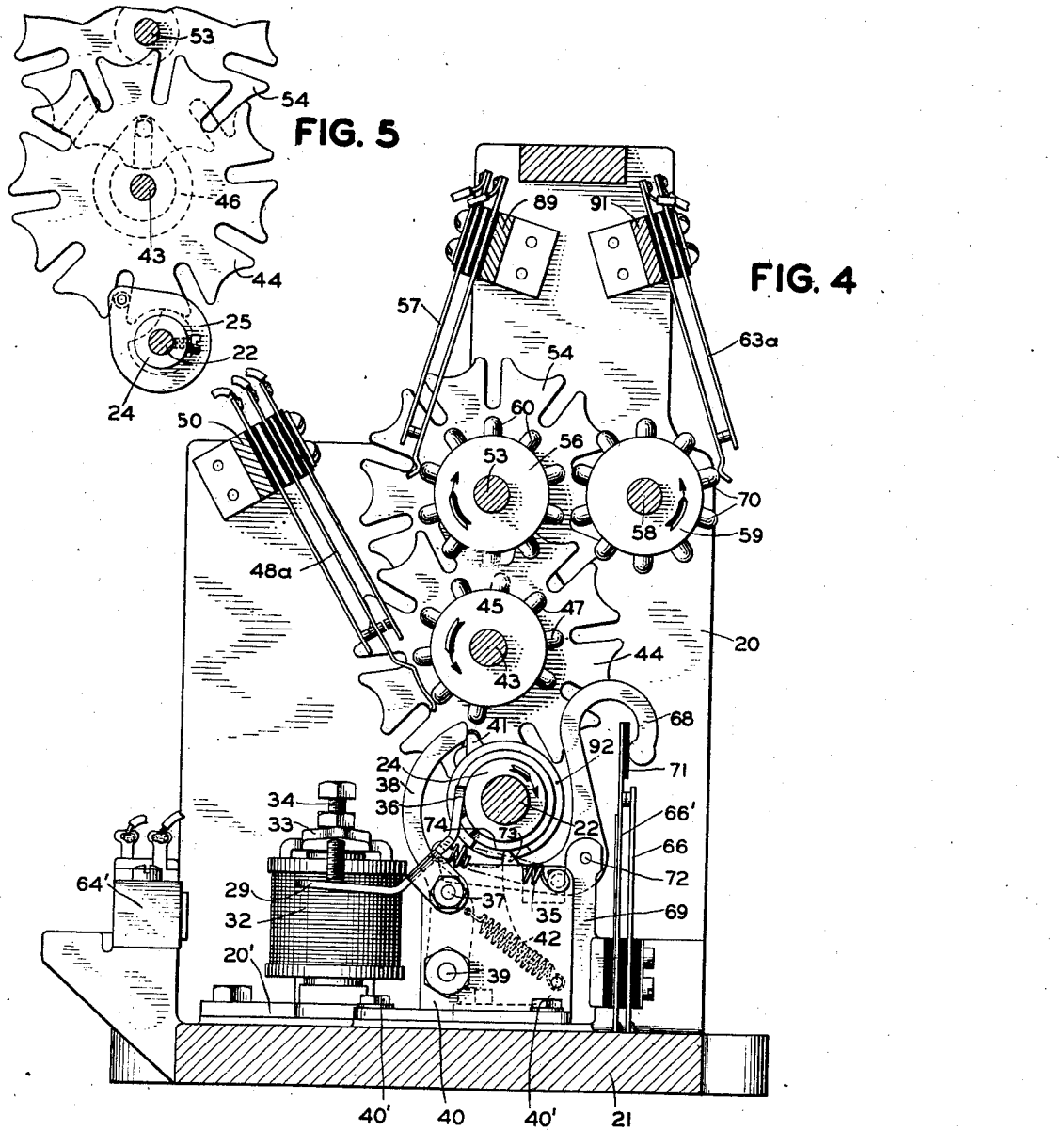
INVENTORS
R.F. DIRKES
R. HOOVER
E.R. WHEELER
BY
Eugene C. Brown
ATTORNEY March 19, 1940.  R. F. DIRKES ET AL  2,193,809
SIGNALING SYSTEM AND APPARATUS THEREFOR
Original Filed Nov. 25, 1935   10 Sheets-Sheet 5
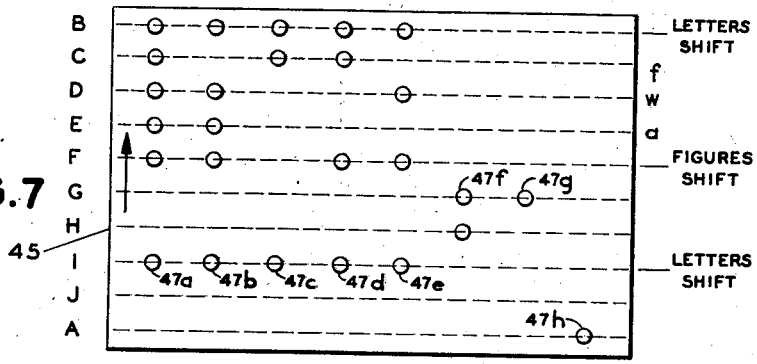
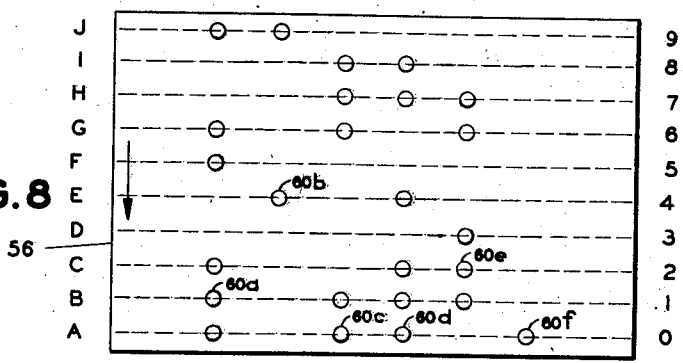
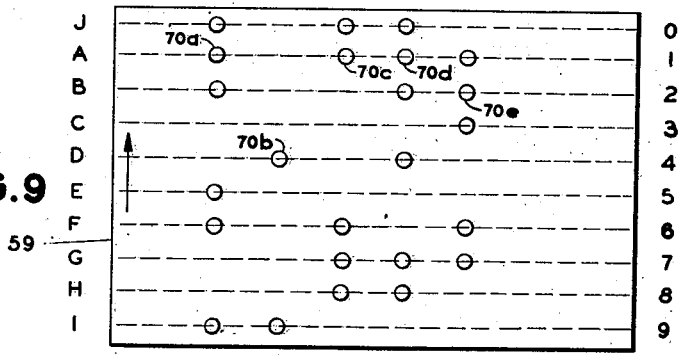
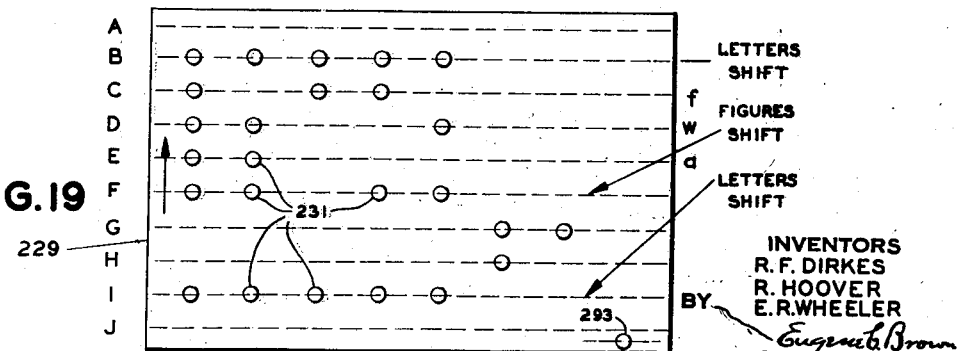
INVENTORS
R. F. DIRKES
R. HOOVER
E. R. WHEELER
BY Eugene L. Brown
ATTORNEY

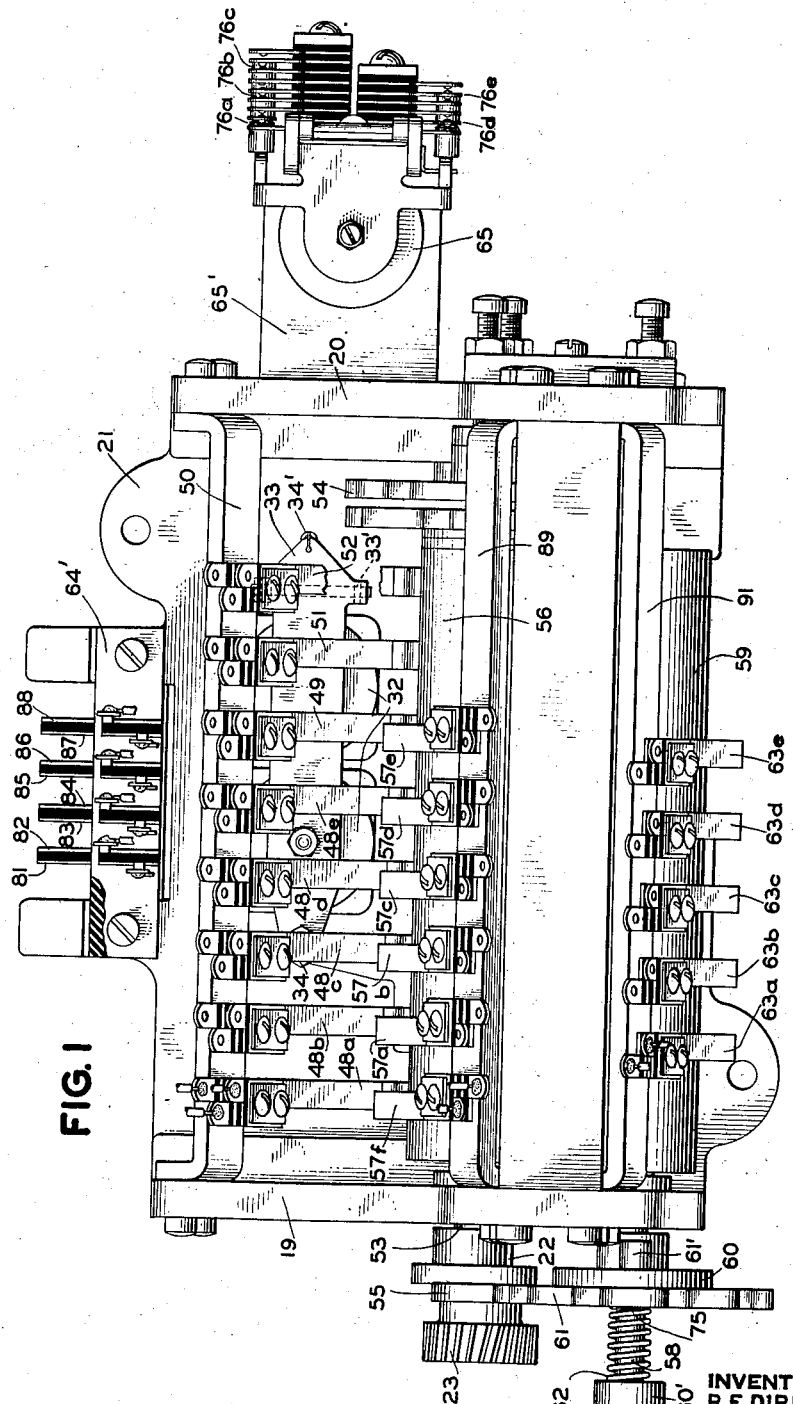

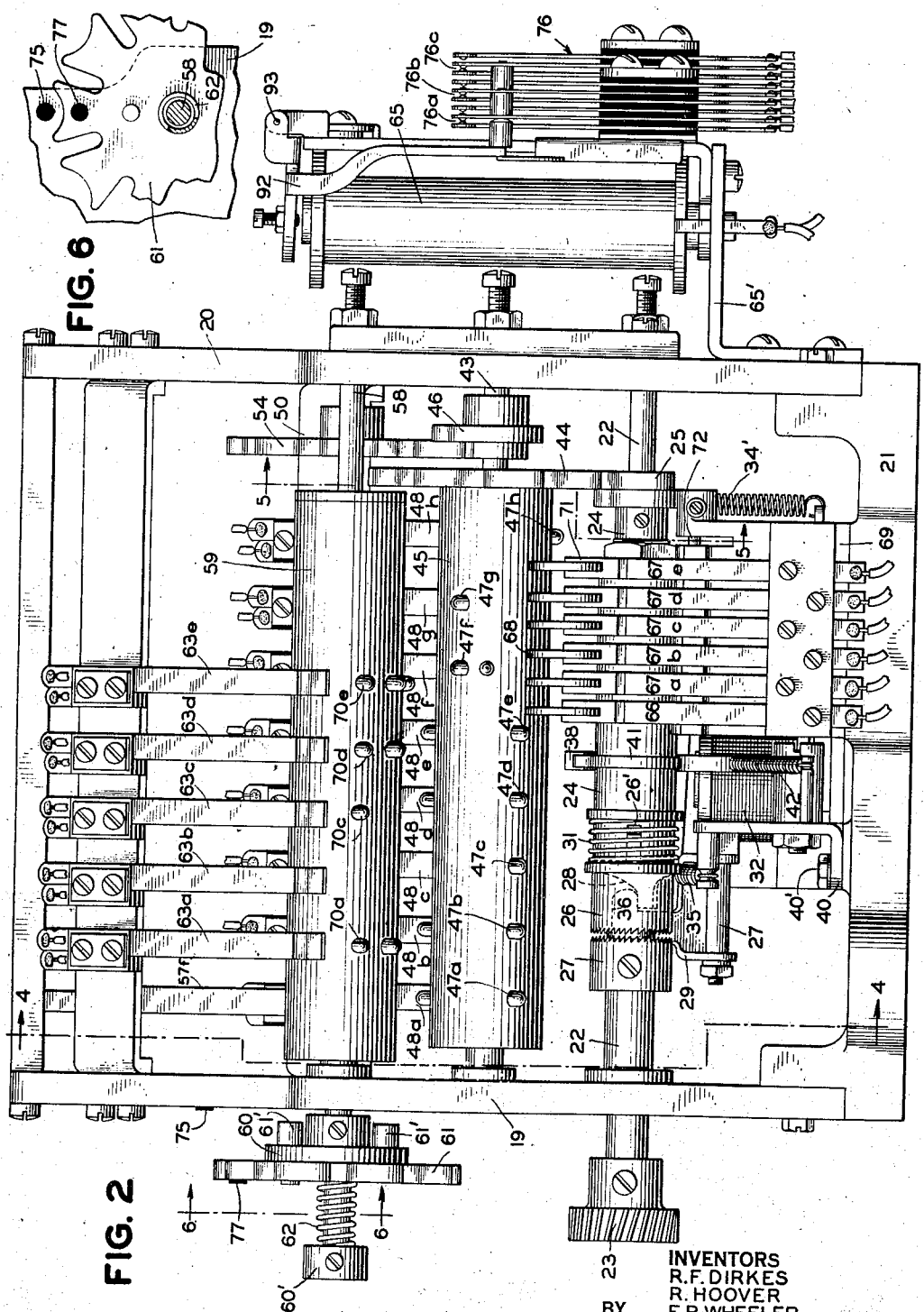

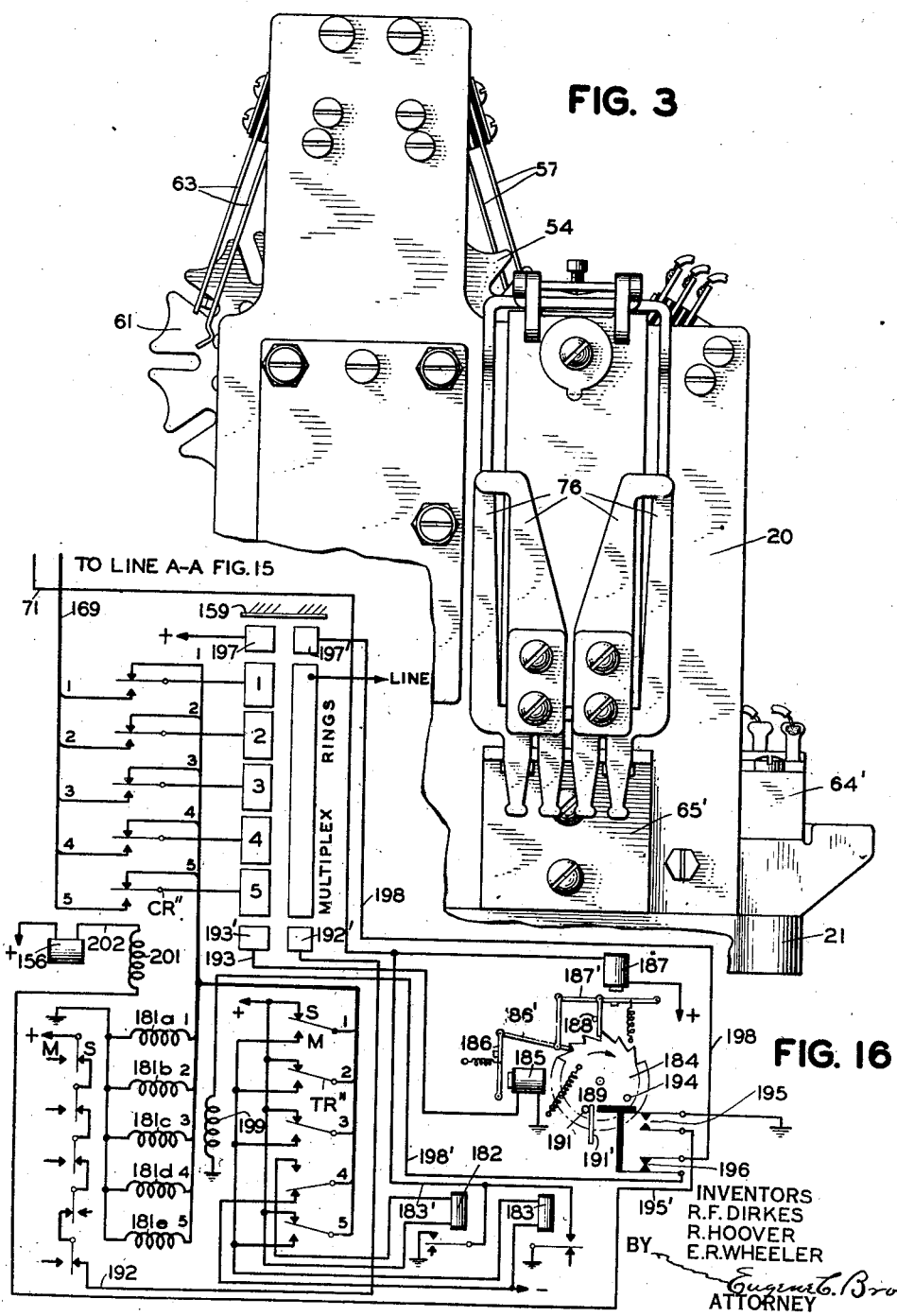

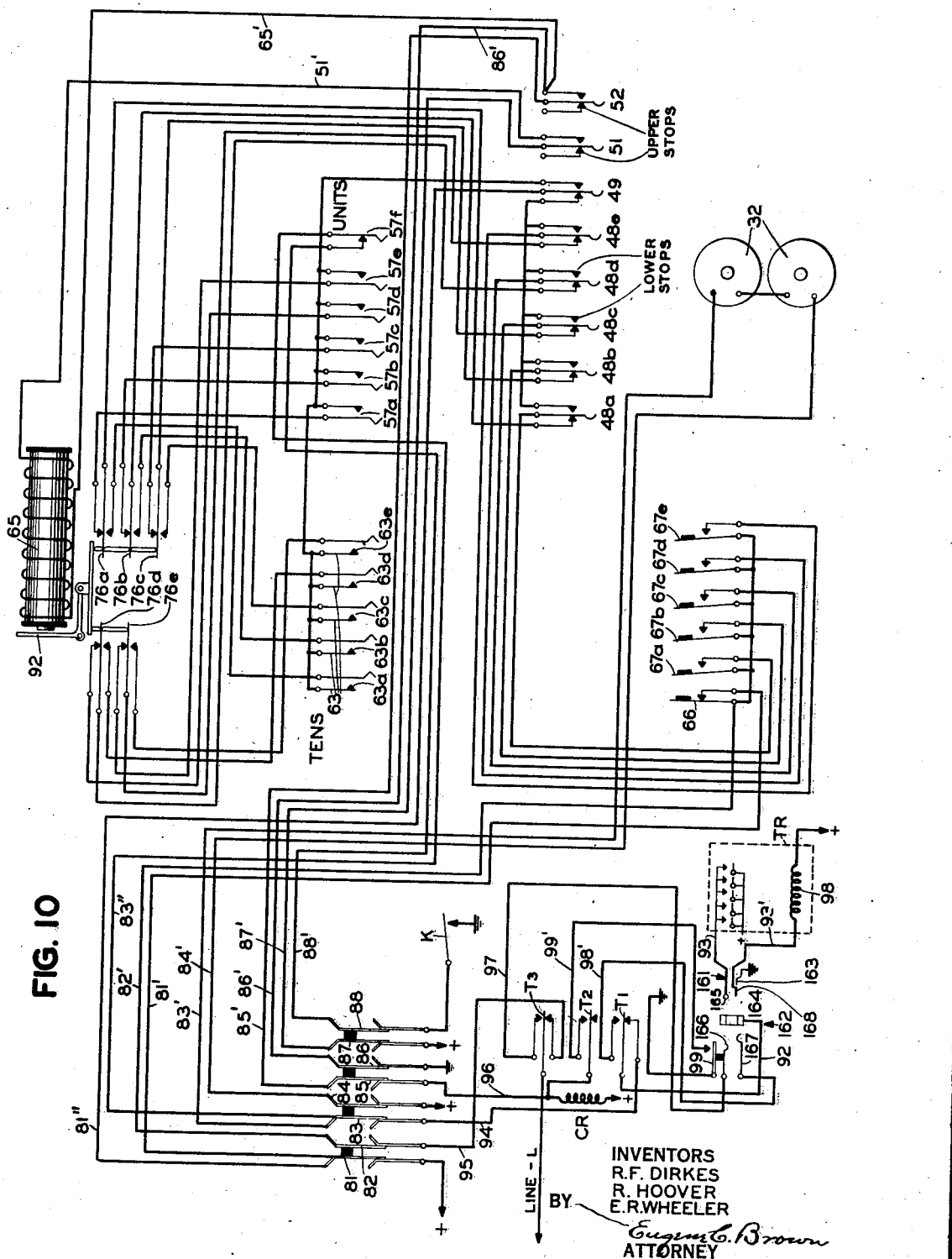

March 19, 1940.  R. F. DIRKES ET AL  2,193,809
SIGNALING SYSTEM AND APPARATUS THEREFOR
Original Filed Nov. 25, 1935  10 Sheets—Sheet 7
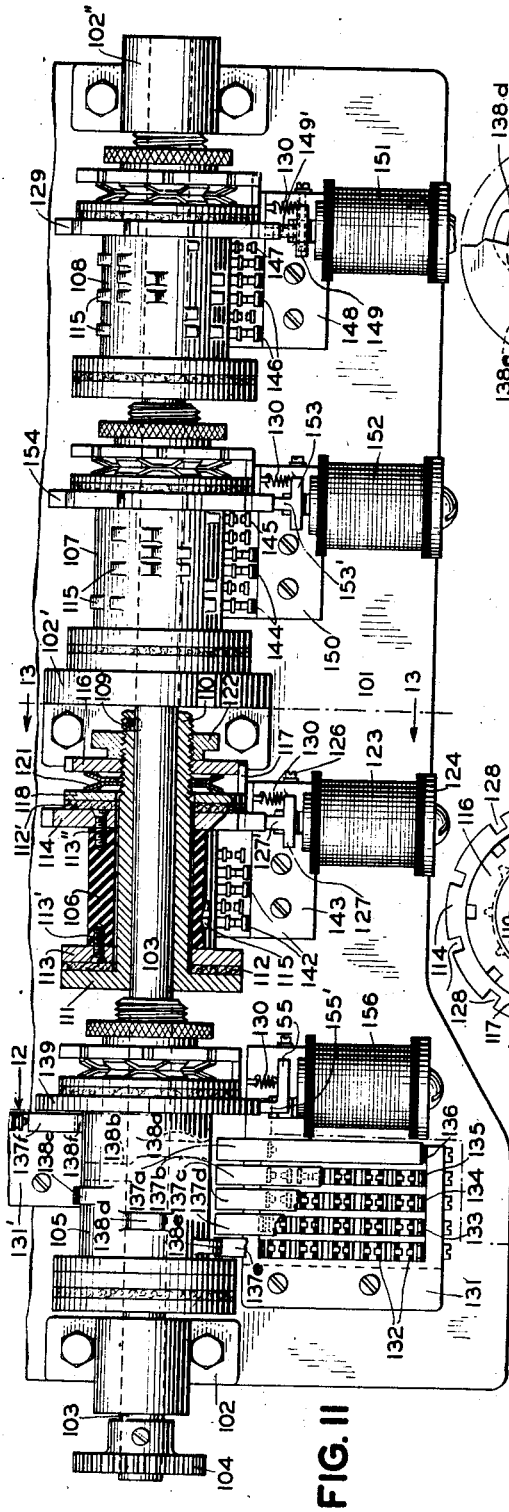
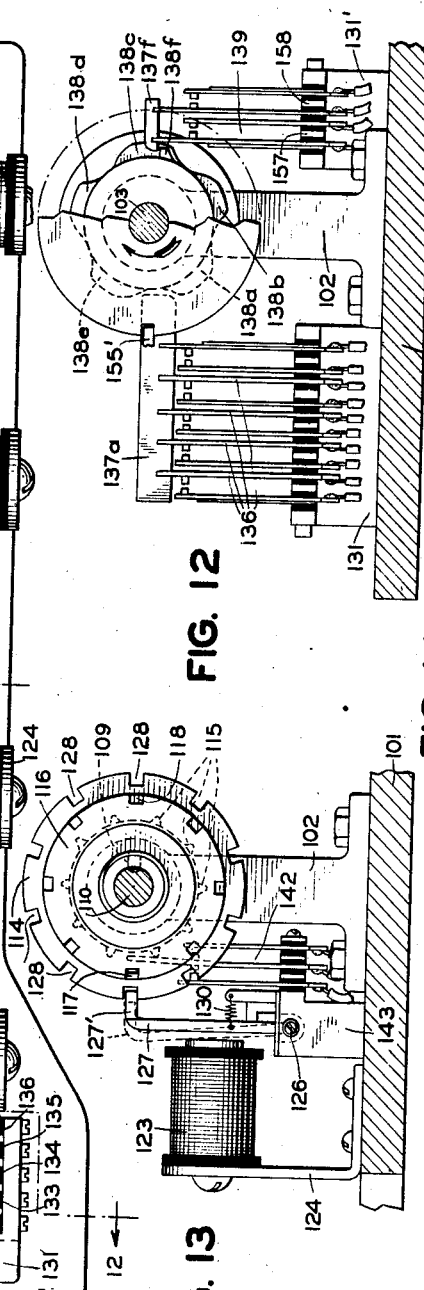
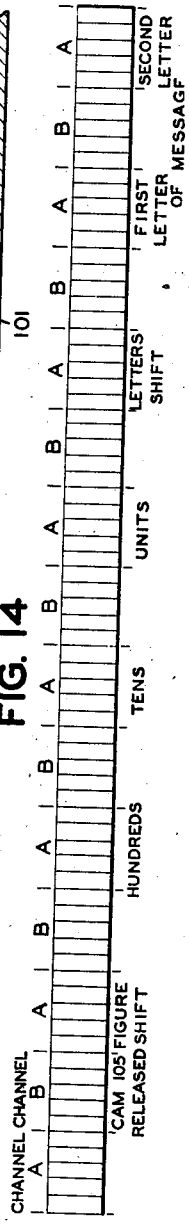
INVENTORS
R.F. DIRKES
R. HOOVER
E.R. WHEELER
BY Eugene E. Brown
ATTORNEY

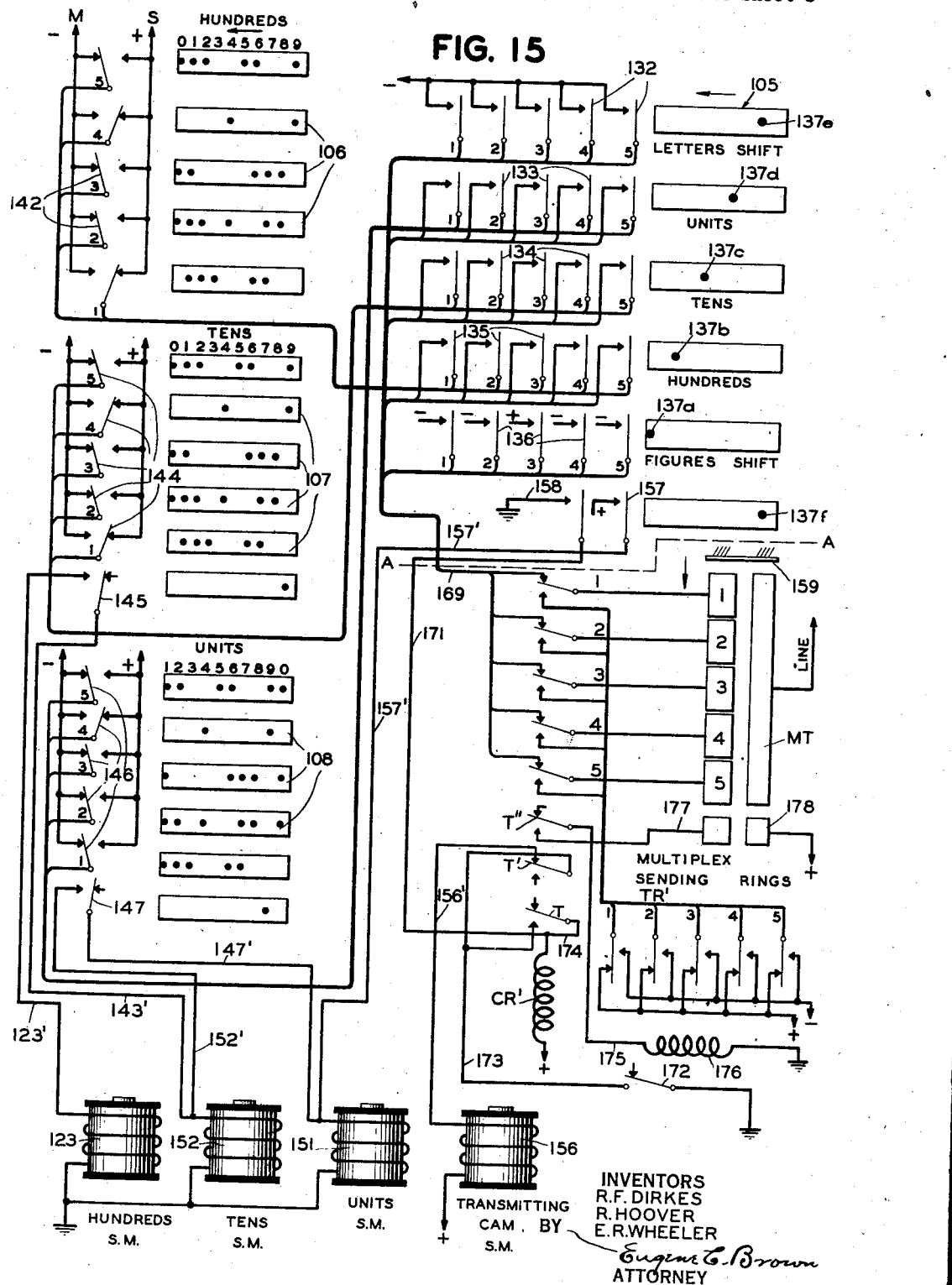

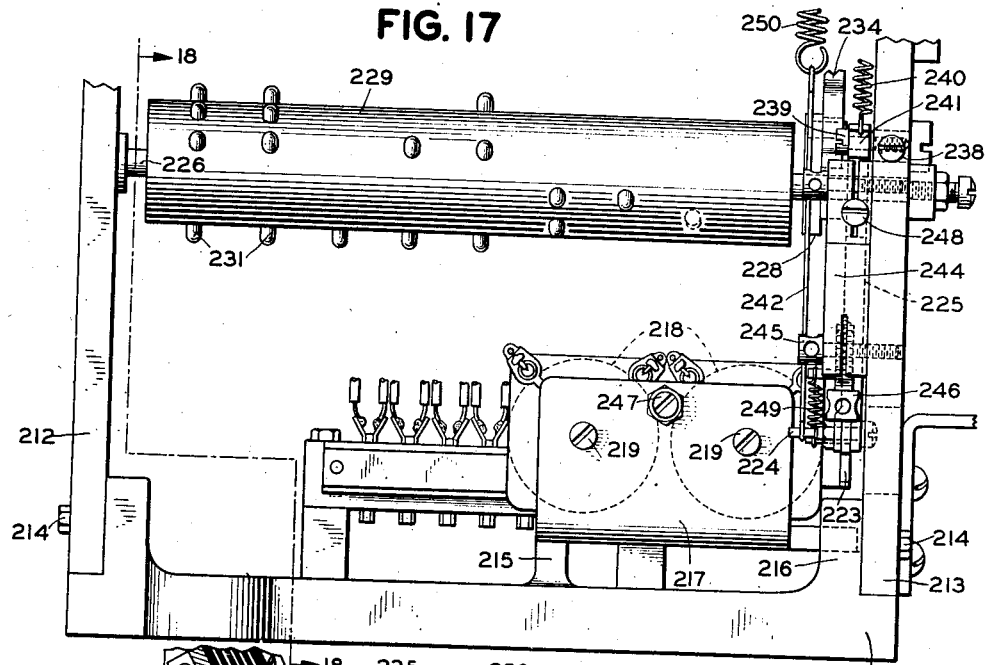
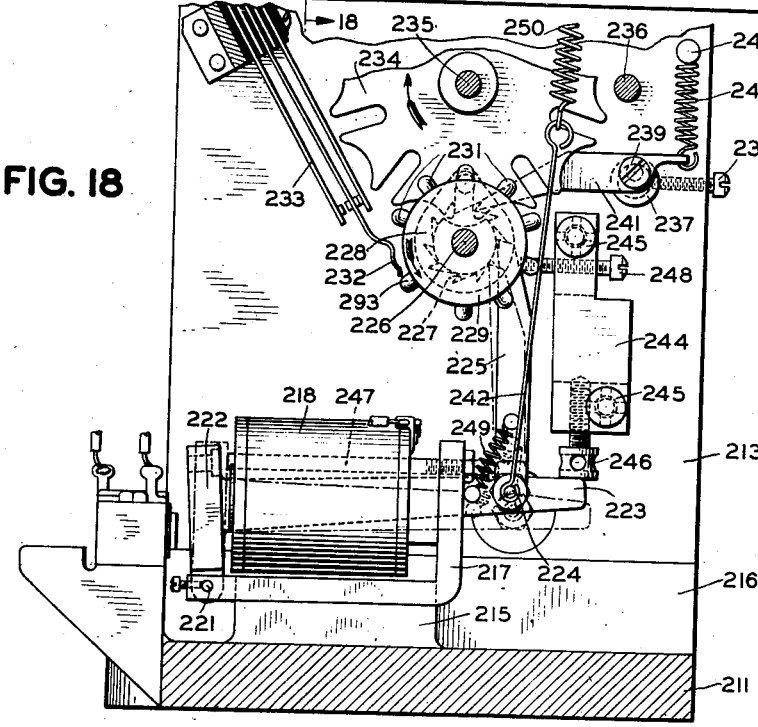

March 19, 1940.    R. F. DIRKES ET AL    2,193,809
SIGNALING SYSTEM AND APPARATUS THEREFOR
Original Filed Nov. 25, 1935    10 Sheets-Sheet 10

INVENTORS
R.F. DIRKES
R. HOOVER
E R WHEELER
BY Eugene C. Brown
ATTORNEY

Patented Mar. 19, 1940

2,193,809

UNITED STATES PATENT OFFICE 2,193,809

SIGNALING SYSTEM AND APPARATUS THEREFOR

Robert F. Dirkes, Jamaica, N. Y., and Ray Hoover and Evan R. Wheeler, Plainfield, N. J., assignors to The Western Union Telegraph Company, New York, N. Y., a corporation of New York Application November 25, 1935, Serial No. 51,522
Renewed June 2, 1939

68 Claims. (Cl. 178—2)

This invention relates to automatic telegraph transmitting mechanism.

It is the usual practice in transmitting telegraph messages to send before the body of the messages some predetermined designating signals. These signals are usually composed of characters to designate the originating point of the message and a numeral, the numerals being consecutive for consecutive messages sent over the same channel or line. In multiplex systems an additional letter is also transmitted to designate the multiplex channel. The purpose of these signals is to permit checking and prevent the loss of messages.

One of the objects of this invention is to provide a telegraph transmitting mechanism to send out automatically designating signals with telegraph messages.

Another object is to provide such a mechanism which will send consecutive numbers with consecutive messages.

A further object is to provide an auxiliary transmitter for sending both letters and figures in prearranged order, in association with each message transmitted.

A still further object is to provide an auxiliary transmitter for automatically interposing service signals between message signals and for varying the service signals transmitted.

Numerous other objects and advantages of the invention will appear from the following description and claims taken in connection with the accompanying drawings forming a part of this application, in which:

Fig. 1 is a plan view of one embodiment of the invention in which the front of the machine is shown at the top of the drawing;

Fig. 2 is a rear elevation thereof;

Fig. 3 is a left end elevation thereof;

Fig. 4 is a sectional view taken on line 4—4 of Fig. 2;

Fig. 5 is a sectional view taken on line 5—5 of Fig. 2;

Fig. 6 is a sectional view taken on line 6—6 of Fig. 2;

Fig. 7 is a developed view of the letters code drum;

Fig. 8 is a developed view of the units code drum;

Fig. 9 is a developed view of the tens code drum;

Fig. 10 is a circuit diagram showing the electrical connections;

Fig. 11 is a plan view of the modified form of the invention in which the rear of the machine is shown at the top of the drawing;

Fig. 12 is a sectional view taken on line 12—12 of Fig. 11;

Fig. 13 is a sectional view taken on line 13—13 of Fig. 11;

Fig. 14 is a timing chart of a multiplex sending head employed in connection with the modified form of Fig. 11;

Fig. 15 is a circuit diagram showing the electrical connections of the modification shown in Fig. 11;

Fig. 16 is a circuit diagram showing electrical connections of a modified control means adapted to be used in conjunction with the modification shown in Figs. 11 to 15 inclusive;

Fig. 17 is a fragmentary rear elevational view of another modification comprising a modified driving means adapted to be used in conjunction with the first embodiment;

Fig. 18 is a sectional view taken on line 18—18 of Fig. 17;

Fig. 19 is a developed view of a letters code drum adapted to be used in conjunction with the last modification.

Figure 20:
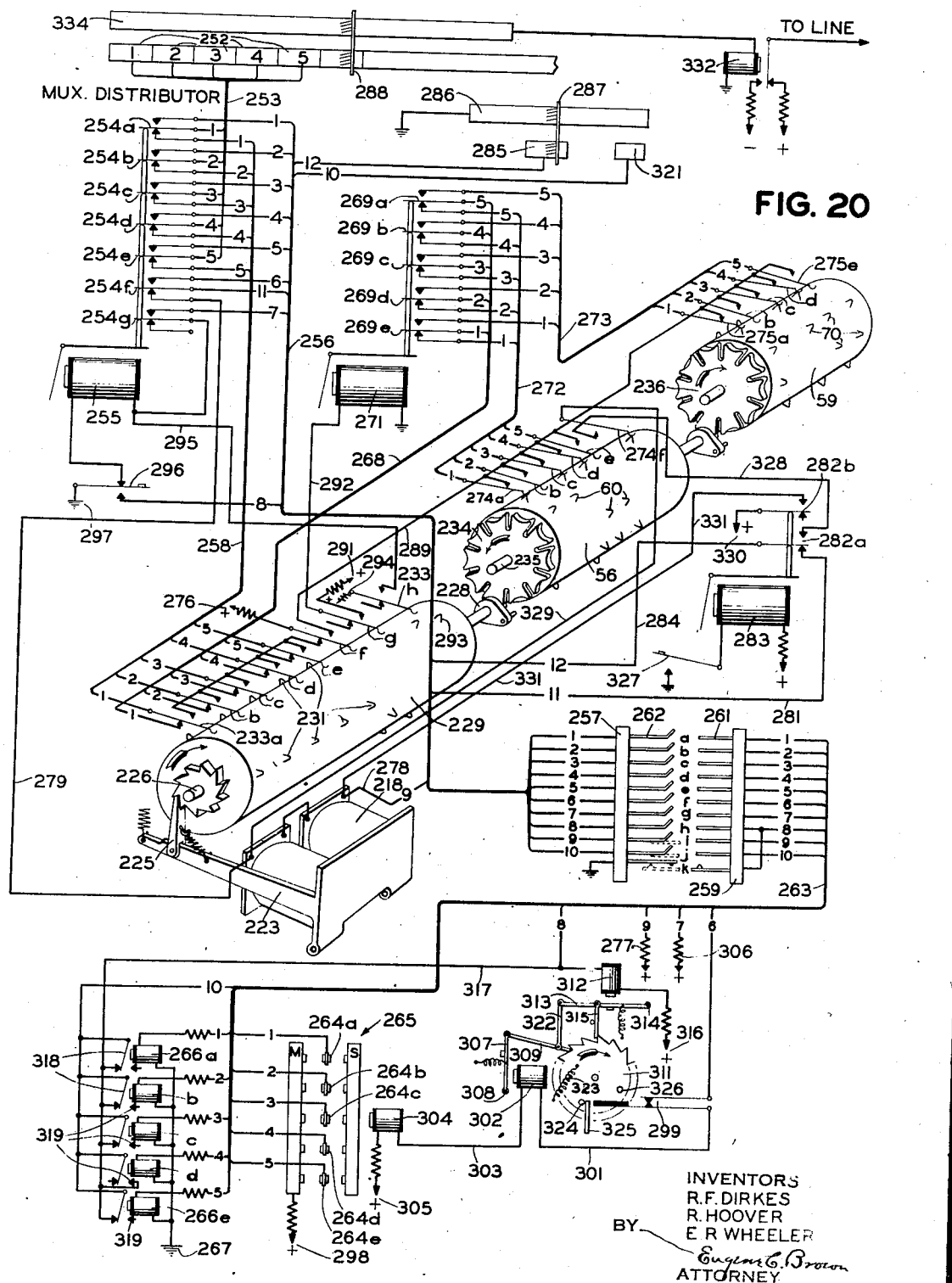
Fig. 20 is a circuit diagram showing the electrical connections in and between the last modification and associated equipment.

One embodiment of the invention contemplates the employment of an independently rotatable transmitting cam sleeve, an associated group of transmitting contacts, a letters code drum and two figures code drums. Contact groups associated with each code drum are selectively operated by code pins placed in a predetermined arrangement around the circumference of the code drums. The code drums are arranged to be progressively rotated by means of Geneva wheels and cams on them and a Geneva cam on the transmitting cam sleeve. Signal codes are set in the contacts associated with the code drums and are selectively connected to the transmitting contacts by means of additional contacts in the letters code drum group and a multiple contact transfer relay. The signal codes set up in the transmitting contacts represent letters and figures and the arrangement is such that the figures will be consecutive for consecutive connections made to the machine. A control means serves to connect, start, stop, and disconnect the machine from the sending circuit at the proper times.

Referring first to Fig. 2, the signaling mechanism is shown mounted between a metal frame composed of two vertical side plates 19 and 20 attached to the base 21 of the machine. A power shaft 22 journaled in the frame plates 19 and 20 is arranged to be driven continuously by suitable motor means (not shown) through a pinion 23. On this power shaft is arranged an independently rotatable transmitting cam sleeve 24, the purpose of which will be described later. Rigidly attached to one end of the cam sleeve is a Geneva cam 25, the purpose of which will also be described later. The cam sleeve 24 and the Geneva cam 25 is revolved by a ratchet clutch composed of two parts, a driven ratchet 26 and a driving ratchet 27, the driving ratchet being fixed to the power shaft 22 to rotate therewith. When the clutch is disengaged, the power shaft is free to rotate without rotating with it the cam sleeve and the Geneva cam. The driven ratchet 26 is slidably mounted directly in front of the driving ratchet 27 and is attached to the cam sleeve 24 by the tongue and groove 26' so that it can slide along the axis of the cam sleeve into and out of engagement with the driving ratchet 27, but can only rotate with the cam sleeve 24. On the driven ratchet 26 is arranged a cam 28 which is engageable with a clutch stop arm 29, pivotally mounted at 27 on a bracket 40 secured to the base 21 by screws 40'. The clutch stop arm 29 coacting with cam 28 serves to disengage the clutch and stop the rotation of the cam sleeve 24 at a predetermined point in its rotation. A clutch spring 31 surrounds the cam sleeve and tends to keep the ratchets 26 and 27 engaged at all times.

A clutch control electromagnet 32, Figs. 1 and 4, is mounted on a sub-base 20' attached to the base 21 of the machine and has an armature 33 pivoted at 33' adjacent one end, the opposite end being provided with an adjusting screw 34. A spring 34' attached to the armature returns it to its inoperative position when the magnet 32 is deenergized. The clutch stop-arm lever 29 is actuated by the adjusting screw 34 on the armature 33 of the control magnet 32 to control the release of the cam sleeve 24, Fig. 2. When the magnet 32 is deenergized, a spring 35 pulls the stop-arm lever 29 in such a position that a lobe 36 on the end of the stop-arm lever 29 is in the path of the cam 28 on the driven ratchet. By the action of the lobe 36 on the cam 28, the ratchet clutch is disengaged and the cam sleeve 24 comes to a stop at a predetermined point in its rotation. Referring to Fig. 4, a latch arm 38 pivotally mounted at 39 on bracket 40 is in operative relation with a cam 41 on the cam sleeve 24. A spring 42 attached to the latch arm 38 keeps the arm engaged with the cam 41. The purpose of the latch 38 is to keep the cam sleeve 24 from rebounding or rotating in a reverse direction due to its sudden stop by the stop-arm 29. When the clutch control magnet 32 is energized, the adjusting screw 34 on the end of the armature 33 engages with an end of the stop arm lever 29 and causes the lobe 36 to be disengaged from the cam 28. By the action of the spring 31, Fig. 2, the driven ratchet 26 is slid along the shaft and engaged with the driving ratchet 27. Thus the cam sleeve 24 rotates with the power shaft 22 and will continue to do so until the clutch is disengaged by the deenergization of the clutch control magnet 32, after which the cam sleeve 24 will be stopped in its predetermined stop position by the action of the lobe 36 on cam 28 as heretofore described.

A letters code drum shaft 43, Figs. 2 and 5, journaled in the frame has attached to it a Geneva wheel 44, a code drum 45, and a Geneva cam 46. The letters code drum shaft 43 is arranged to be rotated by means of the Geneva wheel 44 on it and the Geneva cam 25 attached to the cam sleeve 24. The Geneva wheel 44 is constructed so that it will be intermittently rotated a part of a revolution for every revolution of the Geneva cam 25. Motion is imparted to the wheel 44 only during a part of the revolution of the cam. During the rest of the revolution of the cam 25, the wheel 44 is held in position and from rotating by the construction of the cam and wheel, as shown in Fig. 5. The Geneva wheel 44 has ten radial slots in it and will therefore make one complete revolution for every ten revolutions of the Geneva cam 25.

The letters code drum 45 is shown developed in Fig. 7. Code pins 47a to 47h are placed in rows around the circumference of the drum in a predetermined order. Associated with the code pins in the code drum is a group of eight break-make contacts 48a, 48b, 48c, 48d, 48e, 49, 51 and 52, Fig. 1, mounted on bracket 50. These contacts are in operative relation with the code pins when the code drum 45 is in one of its ten stop positions, indicated in Fig. 7 as positions A to J. The tenth or B position of the code drum is its rest position. The contacts 48a to 48e, 49, 51, and 52, Fig. 1, are the letters contacts. The first five sets of contacts 48a to 48e from the left are signal code contacts and are operated by the first five rows of code pins 47a to 47e around the circumference of the drum 45. Signal codes are set up in these five contacts by the code pins in the code drum. The function and purpose of the remaining three sets of contacts 49, 51 and 52 will be described later.

A shaft known as the units figures code drum shaft 53, Fig. 4, is journaled in the frame plates 19 and 20 and has attached to it a Geneva wheel 54, Figs. 1 and 2, a Geneva cam 55, and a units code drum 56. This shaft is rotated by means of the Geneva wheel 54 on it and a Geneva cam 46 on the letters code drum shaft 43. The Geneva wheel 54 on the units code drum shaft is constructed and rotated in substantially the same manner as the Geneva wheel 44 on the letters code drum shaft 43. The units code drum 56 is shown developed in Fig. 8. Code pins 60a to 60f are placed in a predetermined arrangement around the circumference of the drum. These pins are in six rows around the circumference of the drum. Associated with and in operative relation with the code pins in the units code drum 56, Fig. 1, are a group of six contacts, 57a to 57f, mounted on bracket 58. These contacts are operable by code pins 60a to 60f when the drum is in one of its ten stop positions. These contacts are the units digit contacts. Five of these contacts 57a to 57e are signal code contacts and are operated by the five rows of code pins around the circumference of the units code drum 56. Signal codes are set up in these contacts by the code pins on the units code drum when the drum is in one of its ten stop positions. The signal codes represented by the longitudinal rows of code pins are the figures 1 to zero inclusive, arranged consecutively around the circumference of the drum 56. The purpose of the sixth contact 57f will be described later.

A shaft known as the tens figures code drum shaft 58, Fig. 2, is journaled in the frame of the machine and has attached to it a code drum 59 and collars 60 and 60'. A Geneva wheel 61 slidably mounted on the shaft has pins 61' on it which slide in holes in the collar 60 attached to the shaft. Thus the Geneva must rotate with the code drum shaft, but is slidable along the axis of the shaft. With the Geneva wheel 61 in its normal position as held by the retaining spring 62 coiled around the shaft 58, the wheel is in operative relation with the Geneva cam 55, Fig. 1, on the units shaft 53. With the Geneva wheel 61 slid along the shaft 58 against the action of the spring 62 and out of engagement with the Geneva cam 55, the tens code drum may be rotated manually into any of its ten stop positions and then the Geneva wheel slid back along the shaft into engagement with the cam 55. The purpose of this disengagement feature will be described hereinafter.

The tens code drum 59 is shown developed in Fig. 9. Code pins 70a to 70e are placed in a predetermined arrangement in five rows around the circumference of the drum. Associated with and in operative relation with the code pins in the tens code drum 59 are a group of five contacts 63a to 63e, Fig. 1, mounted on bracket 91. These contacts are operable by the code pins 70a to 70e when the drum 59 is in each of its ten stop positions. These contacts are the tens digit contacts. Signal codes are set up in these contacts by the code pins 70a to 70e on the tens code drum 59 when the drum is in one of its ten stop positions. The signal codes represented by these code pins are the figures one to zero inclusive arranged in consecutive longitudinal rows around the circumference of the drum. Geneva wheel 61 is constructed and normally rotates substantially in the same manner as the Geneva wheels 44 and 54.

A series of eight base clips 81 to 88 inclusive, Fig. 1, mounted in a Bakelite block 64' attached to the base 21 serves to electrically connect the machine to the sending circuit and control means. A multiple contact transfer relay 65 is mounted on bracket 65' attached to the frame 20 of the machine. The relay has a bell crank armature 92, Fig. 2, pivoted at 93 and five break-make contacts 76a to 76e mounted on the relay frame. When the relay is energized, the armature moves the tongues of the contacts 76a to 76e away from their upper stops, Fig. 10, left stops, Fig. 2, so that they make contact with their lower stops, Fig. 10, right stops, Fig. 2. When the relay is deenergized, the armature is returned to its inoperative position by the spring of the contact tongues and the tongues make contact with their upper stops again.

On a bracket 69, Figs. 2 and 4, attached to the base of the machine, is mounted a set of six transmitting contacts 66 and 67a to 67e. Pieces of insulating material 71 attached to the upper ends of the tongues of each pair of contacts, press against the inside of the hooked ends of contact levers 68. One contact lever is provided for each of the six contact tongues. The contact levers 68 are pivotally mounted on rod 72 in the bracket 69. If the contact levers were free to move on their pivots, the contact tongues of each pair would be in engagement with their respective back stop. The cam sleeve 24 has six disc cams 92 (only one of which is shown in Fig. 4) which control the operation of the contact levers 68. On the top edge of the horizontal arm of each contact lever is a hump 73. The pressure of the contact tongue presses this hump against the edge of the cam located just above it. In each cam is a notch 74 and the cams are positioned on the sleeve in such a manner that as the cam sleeve 24 revolves from its rest position, the notches in the cams pass sequentially over the humps of the levers 68. The pressure of the contact tongue springs causes each hump to rise into the notches in the cams, and as the cams revolve, the contacts are permitted to be closed, one after the other. As the third contact 67b closes, the second contact 67a is opened because the hump on its operating lever is cammed out of the notch in the second cam. It is the same in each case and thus two contacts cannot be closed at the same time. The cam discs 92 are so arranged that when the cam sleeve is in its rest position, the first or rest contact 66 is closed. Shortly after the cam sleeve starts to revolve, the rest contact 66 is opened and before the second contact 67a is closed, there is a time interval when all the contacts are open. This interval is known as the start interval and is substantially equal in duration to the time of closure of one of the contacts 67a to 67e.

When electrical connection is made from some transmitting source, as hereinafter described, to the machine, the machine takes control of the sending circuit and sends to the circuit a predetermined series of signals. The ten signals that the particular embodiment shown in Figs. 1 to 9 is designed to send to the circuit are as follows: (1) letters shift (2) letter $f$ (3) letter $w$ (4) letter $a$ (5) figures shift (6, 7) a numeral composed of two digits (8) letters shift (9) blank, and (10) blank. The numerals may be any number from 00 to 99 inclusive, and are sent consecutively for consecutive messages transmitted thereafter over the sending line, except in certain cases as hereinafter described.

When the machine is at rest, the letters code drum 45 is stopped in such a position that the signal code which corresponds to letters shift is set up in the letters contacts 48a to 48e, Fig. 1, by the code pins 47a to 47e respectively in the code drum 45. This position will be such that the code pins in line B, Fig. 7, of the letters code drum will be engaged with the letters contacts 48a to 48e. Each signal is made up of a start impulse which is always of a uniform line condition followed by five intervals or pulses of two different line conditions which in turn are followed by a stop impulse which is always the same and of the opposite line condition from that of the start impulse. The machine shown is so arranged that the start impulse is a no-current interval and the stop impulse a current interval. The manner in which these signals are sent to the circuit will now be described in detail.

Assume that it is desired to send a message over the circuit associated with the numbering machine and that the message is stored in the form of a perforated tape ready to be run through the transmitter TR, Fig. 10. The tip 165 of the plug 161 is connected to the transmitter TR over conductor 93 and ground is applied to the sleeve 163 of the plug. The plug 161 is plugged into the jack 162 and thus connects ground to the tongue T1 of the control relay CR through the jack sleeve 164 over the conductor 92. Since the control relay CR is normally deenergized, the tongues T1 and T3 will be in contact with their lower stops and ground will be applied to base clip 83 through tongue T1 and conductor 94. Battery is permanently connected to the base clip 84 and consequently as ground is applied to the base clip 83, the clutch control magnet 32 which controls the rotation of the cam sleeve 24, Fig. 2, is energized over conductors 84' and 83'. With the clutch control magnet energized, the cam sleeve 24 will be released and rotate with the power shaft as heretofore described until the clutch control magnet is deenergized.

Line battery is connected to the base clip 81 which in turn is connected over conductor 81' to the back stop of the rest contact 66 of the transmitting contacts. Also connected to the base clip 81, over conductor 81'' is the tongue of the battery transfer contact 49 of the letters contact group. The sending circuit L is connected to the tongue T3 of the control relay CR and over conductor 95 to the base clip 82 to which are connected in parallel the tongues of the transmitting contacts 66 and 67a to 67c, over conductor 82'. After the transmitting cam 24 has made a predetermined number of revolutions, the tongue of contact 52 will make contact with its lower (right) stop and thus complete a circuit from base clip 85 over conductor 85' through contact 52 and over conductor 86' to base clip 86 to which is applied ground. Battery is connected through the coil of relay CR over conductor 96 to base clip 85. The closing of contact 52 thus causes the energization of relay CR and its tongues make contact with their upper stops. The clutch control circuit through the tongue T1 will thus be broken and the cam sleeve will come to a stop in its predetermined stop position. The transmitter TR will then be connected over conductor 93, tip 165 of the plug 161, tip 166 of the jack 162, conductor 97 and tongue T3 of relay CR to the line L.

As the contact 52 is closed for a short time only and it is desired to keep the relay CR energized as long as the transmitter has signals to send, a locking circuit is provided. This circuit is from ground at the auxiliary contact 99 on the jack, over conductor 99' to the upper stop of tongue T2 of the relay CR and through the relay coil to battery. This circuit will be broken at the end of the message when the plug is removed from the jack. When the relay CR is energized, the transmitter stepping magnet circuit is completed from ground at the sleeve of the plug 161, sleeve 164 of the jack, conductor 92, tongue T1, to its upper stop, conductor 98', rings 167 and 168 respectively of the jack and plug, conductor 93' and through the coil 98 of the transmitter stepping magnet to battery. The control means shown in Fig. 10 consisting of the relay CR, jack 162 and associated parts, is designed for manual connection between a transmitter and the numbering machine by means of the plug and jack. Other control means may be provided without departing from the spirit of the invention, such as, for example, the use of special perforations in the perforated tape to control the completion of the circuits closed by insertion of the plug 161 in the jack whereby to control the operation of the numbering machine.

Code pins 47a to 47h in the letters code drum 45, Fig. 2, move the tongues of the letters contacts 48a to 48e, 49, 51 and 52 away from their upper stops (left hand stops in Fig. 10) to make connections with their lower stops (right hand stops in Fig. 10) as the drum 45 rotates. The tongues of these contacts are normally in engagement with their upper (left) stops and will remain there unless a code pin 47 moves them to make contact with their lower (right) stops. These contacts are known as "break-make" contacts, the tongues breaking away from their upper stops before they make contact with their lower stops.

Assume that the clutch control magnet 32, Fig. 10, is energized by plugging the plug 161 into the jack 162 so as to cause the release of the cam sleeve, as heretofore described. The rest contact 66 of the transmitting contacts is closed when the cam sleeve 24 is at rest and as the cam sleeve 24 rotates, contact 66 is opened and retained open for an impulse period, before any of the other contacts 67a to 67e are closed, so that a start impulse or interval of no-current goes to the circuit L. The tongues of the letters contacts 48a to 48e are connected to the tongues of their respective transmitting contacts 67a to 67e. The first five code signals to be sent over the circuit are set up in contacts 48a to 48e by code pins in the letters code drum 45, Fig. 4. There are no code pins corresponding to pins 47f in the first five positions B, C, D, E and F, Fig. 7, of the letters code drum to move the tongues of the battery transfer contact 49 to its lower (right) stop, and therefore, in each of these positions of the letters drum 45, line battery is applied to the lower (right) stops of the contacts 48a to 48e, as shown in Fig. 10. Thus, when one of the tongues of contacts 48a to 48e is moved by a code pin to make contact with its lower (right) stop, line battery is applied to this tongue and through it to the associated back stop of transmitting contacts 67a to 67e. Thus, when the associated transmitting contact of group 67a to 67e is closed by the transmitting cam, an interval of current will go to the line. With the tongues of any of the contacts 48a to 48e in contact with their upper (left) stop, battery is not applied to the associated transmitting contact, and therefore, intervals of no-current will go to the line when the associated transmitting contacts are closed by the transmitting cam. The first five rows of code pins in the five positions B, C, D, E and F on the letters code drum make up the code for the first five predetermined signals. Assume the letters drum 45 to be in the B position with contacts 48a to 48e all closed to the left (Fig. 10) and start magnet 32 energized to release the cam shaft 24 for rotation, as the cam shaft starts to rotate it first opens contact 66 to send a start impulse and as cam shaft 22 continues to rotate, the transmitting contact 67a, Figs. 2 and 10, is closed by the cam sleeve and sends to the line a current impulse, since contact 48a is closed to the right by one of the pins 47a. The first transmitting contact 67a is then opened and the second contact 67b is closed and sends to the line, the same as the first contact, an interval of current. The third, fourth and fifth contacts, 67c, 67d and 67e operate in the same way and send their respective impulses of current to the line. This all marking combination is the letters shift signal.

During the last part of the first complete revolution of the cam sleeve 24, the Geneva cam 25 on the cam sleeve will engage in the Geneva wheel 44 on the letters code drum 45 and turn the code drum 45 a tenth of a revolution. The positioning of the code drum 45 is done while the transmitting cam 24 is sending to the line the rest pulse of this signal and the start pulse of the following signal. Thus the next signal is set up in contact 48 during the time that the contacts 48a to 48e are not connected to the sending circuit. This new position of the code drum brings the code pins 47a, 47c and 47d in the C position, Fig. 7, into engagement with the tongues of contacts 48a, 48c and 48d and sets up a new signal in the contacts 48a to 48e which corresponds to the second signal to be sent to the line. There being no code pins corresponding to 47f in the C position, Fig. 7, to move the battery transfer contact tongue 49 from its upper (left) stop, line battery is still applied to the lower (right) stops of contacts 48a to 48e. The transmitting cam 24 continues to rotate and sends to the line the rest pulse followed by the start pulse and then the five code pulses, one, three and four of which are intervals of current, and two and five of which are intervals of no-current in accordance with the positions of the tongues of the letters contacts 48a to 48e. In this way the second signal, corresponding to the letter f, is sent to the line followed by the third, fourth and fifth, which are sent in the same manner from D, E and F positions of the drum 45. The third and fourth signals correspond to the letters w and a respectively. The fifth signal represented in position F of the code drum 45 is a figures shift signal and positions the receiving printer or printers to print figures. Following the transmission of the figures shift combination to the line, the drum 45 moves into its G position. In the G and H positions of the letters code drum 45 there are no code pins to move the tongues of the letters contacts 48a to 48e. These contact tongues therefore rest on their upper (left) stops. There are code pins 47f on the drum 45 in its G and H positions, however, which serve to move the tongue of the battery transfer contact 49 to its lower (right) stop. To this lower stop is connected in parallel the back stops of the units contacts 57a to 57e, and tens contacts 63a to 63e. Thus line battery is applied to these back stops when the code drum 45 is in its G and H stop positions. Assume that the first numeral to be sent out over the line is the numeral 1. This will be received at the receiving printer as 01 because the tens code drum will send a signal to the line and since the number to be sent has no tens digit, the tens drum 59 will send the digit 0. A code pin 47g in the G position of the letters code drum 45 moves the tongue of the transfer relay contact 51 to its lower (right) stop. Thus a circuit is completed from the base clip 87 which is connected to battery, over conductor 87', through the tongue of the transfer relay contact 51, lower (right) stop thereof, thence by conductor 51' through the coil of the transfer relay 65, and by conductor 65' to the lower (right) stop of the transfer contact 52 of the letters contact group and by conductor 86' to ground through the base clip 86.

When the transfer relay 65 is energized, it connects the tongues of the tens contacts 63a to 63e through the lower stops and tongues of the transfer relay 65, thence through the upper (left) stops and tongues of the letters contacts 48a to 48e, and to their respective stops on the transmitting contacts 67a to 67e. When the tens code drum 59 is in one of its ten stop positions, code pins 70a to 70e in this position cause certain tongues of contacts 63a to 63e to make contact with their back stops. As battery is applied to these back stops at predetermined times as heretofore described, and the tongues connected to respective back stops of the transmitting contacts 67a to 67e, battery will be applied to corresponding back stops of the transmitting contacts. Thus, on the sixth revolution of the transmitting cam 24, it will pick up the signal set up in the tens contacts 63a to 63e by the pins in the tens code drum and send it to the line. In this case it will be the code combination which corresponds to the figure zero. On the sixth revolution of the cam sleeve the letters code drum 45 will be rotated into its H position. There is no code pin in this position to operate the transfer relay contact 51. Therefore, the tongue of the transfer relay contact 51 returns to its upper (left) stop and breaks the circuit through the coil of the transfer relay 65. The tongues of the transfer relay 65 drop back to their upper stops and connect the tongues of the units contacts 57a to 57e through the tongues and upper stops of the transfer relay 65 and upper (left) stops and tongues of the letters contacts 48a to 48e to the respective back stops of the transmitting contacts 67a to 67e. Thus a circuit is completed from the units contacts 57a to 57e, to their respective stops on the transmitting contacts 67a to 67e. A code pin 47f in the H position of the letters code drum 45 operates the battery transfer contact 49 and keeps the tongue on its lower (right) stop, thus keeping battery applied to the back stops of the units and tens contacts 57a to 57e and 63a to 63e. The signal code that is set up in the units contacts 57a to 57e by the pins in the units code drum 56 is thus sent to the line on the seventh revolution of the transmitting cam 24 in the same manner as the signal code set up in the tens contacts 63 was sent to line on the sixth revolution of the transmitting cam. In this case it will be the digit 1.

On the eighth revolution of the transmitting cam 24, the letters code drum 45 is rotated into its I position. In this position there is no code pin in the drum 45 to operate the battery transfer contact 49 and battery from the base clip 81 is therefore reapplied to the lower (right) stops of the letters contacts 48a to 48e. Also in this position of the code drum the code pins that operate the contacts 48a to 48e are arranged as they were in the B position. Thus on the eighth revolution of the transmitting cam 24 a letters shift signal is sent to the line and positions the receiving printer to print letters. The J position of the code drum 45 has no code pins in it and therefore on the ninth revolution of the transmitting cam 24 a signal in which the five intelligence impulses are composed of intervals of no-current is sent to the line. The A position of the code drum 45 has one code pin 47h in it. This pin is positioned to operate the tongue of the transfer contact 52 and causes said tongue to make contact with its lower stop. There are no other code pins in the drum in this position to operate the letters contacts 48. Therefore, on the tenth revolution of the transmitting cam 24 another signal in which the five intelligence impulses are composed of intervals of no-current is sent to the line.

In the A position of cam drum 45 the pin 47h engages the tongue of contact 52 to close the same to its lower (right) contact. With the tongue of contact 52 on its lower stop, a circuit is completed from base clip 85 through the transfer contact tongue 52, and its lower stop to ground at the base clip 86. Base clip 85 is connected to battery through the coil of the control relay (CR). When this relay is energized by closing of contact 52 to its lower (right) contact, the relay breaks the ground circuit to the base clip 83 and thus opens the circuit through the clutch control magnets 32. The clutch control magnet 32 being deenergized allows the lobe 36, Figs. 2 and 4, on the stop arm lever 29 to enter into the path of the cam 28 by action of its spring 35 and, by the action of the lobe 36 on the cam 28 to slide the driven ratchet 26 out of engagement with the driving ratchet 27 and bring the cam sleeve 24 to a stop in its predetermined rest position. At the same time another tongue T3 of relay CR disconnects the machine from the sending line L and connects to the line the transmitter TR or other sending device. The transfer contact 52 is mounted and constructed so the code pin 47h will close and open the contact while the drum 45 is being moved into its tenth or B position, and thus the cam sleeve 24 is stopped at the end of its tenth revolution. The machine is now ready to be again connected to the line at the beginning of another message and send before this message the ten signals. In this case the next numeral will be 02.

There are six contacts associated with the units code drum 56. Five of these contacts 57a to 57e, Figs. 1 and 10, being used for impulses in the signaling code and the purpose of the sixth contact 57f will now be described. At certain times it may be desirable to set the machine so that the next message to be sent will be numbered 01 regardless of the number of the preceding message. For this purpose, reset contact 57f is mounted to be operated by a code pin 47f in the units code drum 56. The tongue of this contact is connected to base clip 83 by conductor 83", its back stop is connected by conductor 88' to the base clip 88. A reset key K serves to connect base clip 88 to ground. When the reset key K is closed, it applies ground to a circuit from battery at base clip 84 over conductor 84' through the clutch control magnet 32 over conductors 83' and 83", the reset contacts 57f over conductor 88' to base clip 88 and key K to ground. The closing of the key thus energizes the clutch control magnet 32 and causes the release of the cam sleeve 24, Figs. 1 and 2, as heretofore described, provided the units code drum 56 is in a position other than the A position, that is, provided the reset contact 57f is not open. Upon the release of the cam sleeve 24, it will rotate and continue to do so with the key kept closed until the code pin 68f on the units code drum 56 opens the reset contact 57f and thus opens the circuit through the clutch control magnet 32. This deenergizes the magnet and allows the lobe 36 to enter the path of cam 28 and bring the cam sleeve to rest at its predetermined stop position and with the units drum stopped in its J position. In this position the figure 1 will be set up in the contacts 57a to 57e. The letters code drum 45 will be stopped in its B position.

The tens code drum 59 is manually positioned to set up the figure zero in the tens contacts 63a to 63e after the units drum is positioned in its J position. To reset the tens code drum 59 the Geneva wheel 61 is slid along the tens code drum shaft 58 against its retaining spring 62 and out of engagement with the Geneva cam 55 on the units code drum shaft 58. The Geneva wheel 61 is rotated until a dot or other mark 77, Fig. 6, on the Geneva wheel coincides with a dot or mark 76 on the frame. The Geneva wheel 61 is then allowed to slide back into engagement with the Geneva cam 55. In this position the figure zero will be set up in the tens contacts 63 by the code pins 70a to 70e in the tens code drum 59. Thus the figure zero is set up in the tens contacts 63a to 63e and the figure 1 in the units contacts 57a to 57e and when the next connection is made to the machine, the numeral 01 will be sent to the line.

A modification of the invention is shown in Figs. 11 to 15. This modification is designed to operate in conjunction with a multiplex telegraph transmitting system employing the multiplex five-unit signaling code. As is well known to those versed in the telegraph art, this system requires no synchronizing pulses in the signaling code, synchronism being maintained by other means. The modification contemplates the employment of a series of code drums and associated contact groups for the accomplishment of the objects of the invention. The drums are placed on a common shaft and are frictionally driven therefrom. The rotation of each code drum is controlled by individual step magnets. The armatures of the magnets are engageable with notches in a position disc attached to each code drum. A transmitting cam connects the contact groups of the code drums to the segments of a multiplex channel in the proper sequence. Signal codes are set up in the contact groups by their associated code drums. The machine is connected between a transmitter or other sending means through control means to the segments of a multiplex channel. When connection is made from the sending means to the machine, it automatically starts and sends to the line a series of predetermined signals, then it automatically stops and the control means connects the sending means directly to the multiplex channel.

Referring to Figs. 11, 12 and 13, a metal base 101 has attached to it three bearing posts 102, 102' and 102". A power shaft 103 journaled in these posts is arranged to be driven by suitable motor means (not shown) through a pinion 104. On the power shaft 103 are arranged three code drums 106, 107 and 108, and a transmitting cam drum 105. Only the arrangement of the code drum 106 on the shaft will be described, the code drums 107 and 108 and transmitting cam 105 being attached to the shaft in substantially the same manner. Attached to the shaft 103 by a set screw 109 is a sleeve 110 having a friction plate 111. Adjacent the friction plate 111 is a friction member 112; as for example, a felt disc. Rotatably mounted on the sleeve is a code drum 106 of Bakelite or other suitable insulating material. The code drum has a friction plate 113 attached to one end of it by screws 113' and attached to the other end by screws 113" is a combined position disc and friction plate 114. Adjacent the position disc 114 is another friction member 112'. A plate 116 in threaded engagement with the end of the sleeve member 110 is engaged by an arm 117 on a friction disc 118 to rotate the disc 118 from the plate 116. Split annular springs 121 between the plate 116 and the disc 118 keep the friction plates and discs frictionally engaged with the friction members 112 and 112'. The pressure of the springs is regulated by the plate 116 and locknut 122 which are in threaded engagement with the end of the sleeve member 110. From the above description it can be seen that the code drum 106 will tend to rotate with the power shaft 103 through the action of the friction members 112 and 112" but the rotation of the code drum can be stopped without stopping the rotation of the shaft.

A step magnet 123 is attached to a bracket 124 which is mounted on the base 101. The magnet armature 127 is pivoted at 126, Fig. 13. An extending arm 127' on the end of the armature 127 is engageable with notches 128 of the position disc 114 when the magnet 123 is deenergized. When the magnet 123 is energized, the arm 127' will be withdrawn from one of the notches 128 in the position disc 114, and the code drum 106 will then rotate with the power shaft 103. With the code drum 106 rotating with the shaft 103, if the armature 127 is released by deenergizing the magnet 123 to permit the end 127' thereof to enter a notch 128 on the position disc 114, the drum 106 will be stopped. All three of the code drums 106, 107 and 108, and the transmitting cam drum 105 are constructed to operate in substantially the same manner, their rotation being controlled by their associated stepping magnets. Armatures 149, 153 and 155 of stepping magnets 151, 152 and 156 control the movements of drums 108, 107 and 105, the extending arm 149' on armature 149 being engageable with notches on the position disc 129 attached to code drum 108, the arm 153' on armature 153 being engageable with notches on the position disc 154 attached to code drum 107, and the arm 155' on armature 155 being engageable with the notch on the position disc 139 attached to the transmitting cam 105. Retractile springs 130 return the armatures to their normal or inoperative positions when the magnets are deenergized.

The position disc 139 attached to the transmitting cams 105 has one notch in it and the cam 105 will therefore make one complete revolution when the magnet 156 is energized. The position discs 114, 129 and 154 each have ten notches in them and the code drum 106, 107 and 108 therefore can be stopped in ten different positions.

Code pins 115 are placed around the circumference of each code drum in a predetermined arrangement. These pins are arranged in ten rows extending longitudinally of the drums. In accordance with the signaling code employed the rows represent the signal code combinations of figures 1 to 0 inclusive, arranged consecutively around the drum. When a code drum is stopped in one of its ten positions, a longitudinal row of code pins operates contacts in their associated contact groups.

Mounted on a bracket 131 attached to the base 101 of the machine and in operative relation with the transmitting cam 105 are a series of five groups of contacts 132, 133, 134, 135 and 136. Contact operating bars 137a to 137e attached to the top of each tongue in a group are in operative relation with associated humps 138a to 138e on the transmitting cam 105. Mounted on a bracket 131', Fig. 12, are two contacts 157 and 158 with an operating bar 137f attached to their tongues. The contact operating bar 137f is in operative relation with the hump 138f on the transmitting cam 105. The transmitting cam 105 has six humps 138a to 138f on it, one for each operating bar and group of associated contacts. These humps are placed in a predetermined arrangement around the circumference of the transmitting cam 105. The position disc 139 on the transmitting cam 105 having only one notch in it, the transmitting cam will be brought to rest in only one position and in this position none of the humps are engaged with an operating bar. The contact operating bars 137 are normally toward the cam 105, being placed there by the spring of the contact tongues. With the bars toward the cam, the associated contacts will all be open and when a bar is engaged by its associated hump, the bar will be pushed away from the cam and it will move the tongues of the contacts to which it is attached to make contact with their back stops.

The hundreds code drum 106 has associated with and in operative relation five break-make contacts 142, one contact for each impulse in the signaling code, all mounted on bracket 143. The tens code drum 107 also has associated with and in operative relation five break-make contacts 144, one for each impulse of the signaling code and one make contact 145, all mounted on bracket 150. The units code drum 108 has associated with and in operative relation five break-make contacts 146, one for each impulse of the signaling code and a single make contact 147, all mounted on bracket 148.

As stated, the transmitting cam 105 has six groups of contacts in operative relation with it, mounted on brackets 131 and 131'. The first group 136, called a figure shift transmitting group, has five make contacts. These contacts will all be closed whenever the hump 138a on the cam 105 associated with this group is engaged with the figures shift transmitting contact operating bar 137a. The next three groups called the hundreds transmitting group 135, the tens transmitting group 134 and the units transmitting group 133, each have five make contacts operated by humps 138b, 138c and 138d, respectively. The fifth or letters shift transmitting contact group 132 operated by hump 138e has five make contacts.

The front stops of the units, tens and hundreds contact groups 142, 144 and 146 are all connected to positive or spacing battery as shown in the circuit diagram, Fig. 15. The front stops of the contacts are the stops their respective tongues will be in contact with when their tongue is not engaged with a code pin or cam 115 on a code drum. The back stops of the above three groups 142, 144, 146 are all connected to negative or marking battery. The back stops of the contacts are the stops their respective tongues will be in contact with when their tongue is engaged with a code pin or cam 115 on a code drum.

As shown in the circuit diagram, Fig. 15, the tongues of the five break-make contacts 146 in the units contact group are connected to respective tongues of the units transmitting contact group 133. Tongues of the five break-make contacts in the tens contact group 144 are connected to respective tongues of the tens transmitting contact group 134. Tongues of the five break-make contacts 142 in the hundreds contact group are connected to respective tongues of the hundreds transmitting contact group 135.

The tongues of the five contacts 132 in the letters shift transmitting group, the back stops of the units transmitting contacts 133, the back stops of the tens transmitting contacts 134, the back stops of the hundreds transmitting contacts 135 and tongues of the figures shift transmitting contacts 136 are all connected to respective upper contact stops on a multiple contact control relay CR'.

The back stops of the first, second, fourth and fifth contacts of the figures shift transmitting contacts 136 are connected to marking battery and the back stop of the third contact is connected to spacing battery. The back stops of the first, second, third, fourth and fifth contacts of the letters shift transmitting contacts 132 are connected to marking battery.

The back stops of the contacts 157 and 158 are connected to spacing battery and ground respectively. The contact 158 is connected over conductor 171 through the coil of control relay CR' to battery. Relay CR' serves to disconnect the sending means from the multiplex segments and connect the numbering machine to the multiplex sending head when the contact 158 is closed, as will be hereinafter described. The contact 157 is connected over conductor 157' through coil of the units stepping magnet 151 to ground. The tongue of contact 147 of the units group is also connected to the coil of the units stepping magnet 151 over conductor 147'. The back stop of contact 147 is connected over conductor 152' through the coil of the tens stepping magnet 152 to ground. The tongue of the contact 145 of the tens group is also connected to the coil of the tens stepping magnet 152 over conductor 143'. The back stop is connected over conductor 123' through the coil of the hundreds stepping magnet 123 to ground.

The first five tongues from the top of the control relay CR' shown only in the wiring diagram, Fig. 15, are connected to respective segments on the multiplex sending head MT. The lower stops of these five tongues are connected to respective tongues of the transmitter TR'. The upper stop of tongue T' is connected over conductor 156' through the coil of transmitting cam stepping magnet 156 to battery. Ground is connected through a switch 172 over conductor 173 in parallel to the lower stop of tongue T and to the tongue T'. The tongue T is connected over conductor 174 to the coil of the control relay CR'. The tongue T'' is connected over conductor 175 through the coil 176 of the transmitter stepping magnet to ground. The lower stop of tongue T'' is connected over conductor 177 to battery through local segment 178 on the multiplex sending distributor MT.

Assume that the code drums are at rest and that the signal code set up by the units, tens and hundreds code drums 108, 107 and 106 in their associated contact groups 146, 144 and 142 are the figure 1, figure 0 and figure 0 respectively. As there is only one notch in the transmitting code drum position disc 139, it will be at rest in its predetermined rest position. In this position none of the humps 138 on the drum 105 are in contact with a contact operating bar 137. Therefore, all the contacts in the transmitting groups will be open.

Assume that it is desired to send a message over the circuit that this modification of the invention is associated with and this message is in the form of a perforated tape to be run through the tape transmitter TR'. The control relay CR' is normally deenergized and therefore its tongues will be in their upper or retracted position. Switch 172 is closed and a circuit is completed from ground through the switch 172, conductor 173, tongue T', its upper stop, conductor 156' and through the coil of stepping magnet 156 to battery, thus causing said magnet to be energized. The energization of the magnet 156 actuates its armature 155 to withdraw the arm 155' on the armature 155, from the notch in the position disc 139, thus permitting the code drum 105 to rotate with the power shaft 103 through the action of the frictional clutch, as heretofore described. As the code drum 105 revolves, a hump 138a engages an operating bar 137a attached to the tongues of the figures shift transmitting contacts 136 and causes said tongues to make contact with their back stops. The signal code representing figures shift is set up in the back stops of contacts 136 and when contacts 136 are closed, this signal code will be set up in the segments of the multiplex head through the first five upper stops and tongues of control relay CR'. The brush on the multiplex head wiping over these segments sends the signal code for figures shift to the sending circuit.

Assume that the multiplex is divided into two channels, A and B, sending to first one channel, then the other, as shown in the timing chart, Fig. 14, and that this machine is associated with channel A. The closing of switch 172 may be so timed with relation to rotation of the multiplex brush 159 that from the time the stepping magnet 156, Fig. 15, is energized, to the time when the figures shift transmitting contacts 136 are closed, the multiplex brush 159 is passing over segments in channel B, and after the contacts 136 are closed, the brush starts to pass over the first segment of channel A. The relation between the speeds of rotation of the multiplex brush and the power shaft 103 are such that the hump 138a on the code drum 105 engages the contact operating bar 137a for a time sufficient to keep the contacts 136 continuously closed while the multiplex brush is passing over the segments of channel A. When the brush has passed over the five segments in channel A, the hump 138a will disengage the operating bar 137a of contacts 136 and the contacts will open by action of the spring tongues. Before the brush starts on the first segment of channel A again another hump 138b on transmitting cam 105 will have moved the operating bar 137b attached to the tongues of contacts 135 so that the tongues make contact with their back stops. This connects the signal code set up in the hundreds contacts 142 to the multiplex segments as heretofore described. Since the figure zero is set up in the hundreds contacts, this signal will go to the line as the multiplex brush passes over the segments of channel A the second time. Contacts 135 close just before the brush reaches the first segment and remain closed until the brush has passed over all five segments in channel A. While the brush is again on channel B segments, contacts 135 are opened and contacts 134 closed. Closing of contacts 134 connects the signal set up in the tens contacts 144 by the code drum 107 to the segments of channel A. The brush passes over channel A segments a third time and sends the signal set up in contacts 144 to the line. This signal will also be the figure zero, as that is the signal set up in contacts 144. The signal set up in contacts 146 by code drum 108 are sent to the line in substantially the same manner by closing of the units transmitting contacts 133. This signal will be the figure one as that is the signal set up in contacts 146 by the code drum 108. As the code drum 105 rotates further, the letters shift signal set up in contacts 132 is connected to the multiplex segments and sent to the line on the fifth revolution of the multiplex brush. Thus the following five signals are sent to the line before the body of the message: (1) figures shift to position the receiving printer or printers to print figures, (2) figure zero, (3) figure zero, (4) figure one, and (5) a letter shift signal to position the receiving printer or printers to print letters. These signals will be received and recorded by the receiving means before the body of the message as the numeral 001.

Shortly after the contacts 132 are opened, contacts 157 and 158 are also closed by means of operating bar 137f and associated hump 138f. The closing of contact 158 completes a circuit from ground at the back stop of the contact, tongue 158, conductor 171 and through the coil of the control relay CR' to battery. This energizes the relay CR' and causes its tongues to move to their lower positions. The first five tongues of the relay connect associated tongues of the transmitter TR' to respective segments on the multiplex sending head. Tongue T'' in contact with its lower stop completes a circuit from battery at the local segment 178 of the multiplex head over conductor 177, tongue T'', conductor 175 and the coil of the transmitter stepping magnet 176 to ground. Tongue T in contact with its lower stop completes a locking circuit from battery through the coil of the relay CR' over conductor 174 through tongue T over conductor 173 through switch 172 to ground.

At the end of the message the switch 172 may be opened to break the locking circuit through the coil of the relay CR' and thus cause the tongues to return to their upper position. In this position they are again ready for the switch 172 to be closed at the beginning of another message to cause the release of the transmitting cam, as heretofore described. Contact 157 is closed at the same time as contact 158 and it completes the circuit from battery at the back stop of contact 157 through its tongue and over conductor 157' to the coil of the unit stepping magnet 151 to ground. This energizes the magnet and causes it to pull the arm 149' on its armature 149 from a notch in the position disc 129. The position disc 129 and code drum 108 are thus free to rotate with the power shaft through its friction clutch. As the contact 157 is closed for a relatively short time because of the small hump and operating bar 138f and 137f respectively, the magnet 151 will be deenergized shortly after the arm 149' has been pulled out of a notch 128. Therefore, the arm 149' will drop back and ride on the circumference of disc 129 and drop into the next notch, thus stopping the position disc in its next stop position. In this position the signal code for figure 2 is set up in the contacts 146 by the code drum 108.

When the sending of the first message is completed and connection is made to the machine through the control means a second time before the start of a second message, the machine will start and send to the line the numeral 002 preceding the second message, in the same manner as numeral 001 was sent preceding the first message. In the same manner consecutive numerals are sent before consecutive messages thereafter up to the numeral 008. After the machine sends up the numeral 008 to the line, the code drum 108 is positioned to set up the signal 9 in contacts 146 as heretofore described. In this position a pin on the drum 108 closes contact 147. With contact 147 closed, a parallel circuit is completed from the tongue of contact 157 to the coils of the units stepping magnet and the tens stepping magnet 151 and 152 respectively to ground. Now, when the ninth connection is made to the machine, the numeral 009 will be sent to the line and the contact 157 will be closed after the transmission of the letter shift signal as heretofore described. With contact 157 closed, both stepping magnets 151 and 152 will be energized and therefore, both code drums 107 and 108 will be stepped into their next position. The signal code for figure 1 and figure 0 will be set up in contacts 144 and 146 respectively for these positions of the code drums. Thus the signal codes for the numeral 010 is set up in the three sets of contacts 142, 144 and 146, and sent to the line before the tenth message. Code drum 107 is thus stepped one step for every complete revolution or ten steps of code drum 108. After the 89th message has been numbered and the figure 9 is set up in the tens contacts 144 by pins in the code drum 107, another pin in code drum 107 closes contact 145. After the 98th message has been numbered and the figure 9 set up in both sets of contacts 144 and 146, both contacts 145 and 147 are closed simultaneously. Thus a circuit is completed from the tongue of contact 157 in parallel to the coils of stepping magnets 123, 151 and 152 to ground. After sending the numeral 099 and contact 157 is closed, all three stepping magnets 123, 151 and 152 will be energized. Thus all three code drums will be stepped one notch and the numeral 100 will be set up in the three sets of contacts 142, 144 and 146. The machine operates in the same manner until the numeral 999 is sent, when the numeral set up is 000. The tens code drum 107 steps one step for every ten steps of the units code drum 108, and the hundreds code drum 106 steps one step for every ten steps of the tens code drum 107, or every hundred steps of the units code drum 108. The units code drum 107 steps one step for every complete revolution of the transmitting cam 105, as heretofore described.

Fig. 16 shows a modified control means adapted to be used in conjunction with the modification shown in Figs. 11 to 15. This control means is designed to be operable by a plurality of predetermined perforations preceding each telegraph message in a telegraphic perforated tape passing through the associated tape transmitter. The tongues of the transmitter are normally connected to the segments of the associated multiplex channel. When these predetermined perforations reach the transmitter, the following functions are performed. The tape transmitter is stopped and disconnected from the multiplex. The numbering mechanism is connected to the multiplex and started, whereupon it transmits to the multiplex its group of predetermined signals as heretofore described and at the completion of its cycle of operation the numbering mechanism is stopped, disconnected from the multiplex, the tape transmitter reconnected to the multiplex and started, whereupon it transmits the signals of the message represented in the telegraphic tape. The predetermined perforations in the tape that cause the numbering mechanism to operate represent a series of two signals in which the fourth intelligence pulses are marking and the first, second, third and fifth pulses spacing.

Fig. 16 shows the wiring diagram of the modified control means adapted to be used in conjunction with the wiring diagram of the modification shown in Fig. 15. The control means shown in Fig. 15 may be cut away on line A—A and the modified control means shown in Fig. 16 connected at this line by cable and wire 169 and 171 respectively. The magnet 156 shown in both Figs. 15 and 16 is the release magnet also shown in Fig. 11 with the same reference number, the purpose of which has heretofore been described.

The end of the cable 169 shown in Fig. 16 is fanned out and connected to the proper lower stops of the multiple contact control relay CR''. The tongues of the control relay CR'' are connected to respective segments on the multiplex sending head. The upper stops of the relay are connected to respective tongues of the tape transmitter TR'' and also to respective coils of polarized relays 181a, 181b, 181c, 181d and 181e. The tongues and the stops of the polar relays 181a to 181e are so connected that only when the pulses to the respective relays are spacing, spacing, spacing, marking and spacing, a circuit is completed through the tongues and stops as shown in Fig. 16, and for any other combination of pulses this circuit will be open. The upper stops of the transmitter TR" are connected to spacing or positive battery, the 4th stop being connected through the coil of relay 182. The 1st, 2nd, 3rd, and 5th lower stops of the transmitter are connected through the coil of relay 183 to negative or marking battery. The 4th lower stop is connected directly to marking battery.

A disc 184 is so mounted in conjunction with magnet 185 that it is rotated one notch by the arm 186' on the armature 186 when the magnet 185 is energized. Release magnet 187, when energized, causes its armature 187' to remove the arm 186' and latch 188 from notches in the disc 184, thus allowing the disc to rotate in a reverse direction by action of the spring 189. The reverse rotation of the disc 184 is limited by a pin 191 on the disc. engaging a stop 191'.

Assume that a message in the form of a perforated tape is to be run through the tape transmitter TR" and that the message is preceded by two signal representations in the tape in which only the 4th pulses are marking. When the first one of these signals reaches the transmitter, and is transmitted, the tongues of the transmitter will be positioned as shown in Fig. 16 which in turn will cause the tongues of the polar relays 181a to 181e to be positioned as shown. Thus a circuit will be completed from battery at the 1st tongue through the tongues and stops of relays 181a to 181e, over conductor 192 to the local segment 192' of the multiplex sending distributor. Now, when the brush 159 passes over the segments 192' and 193', the circuit will be continued over conductor 193 through the coil of magnet 185 to ground. Thus magnet 185 will be energized and cause its armature 186 and arm 186' to rotate the disc 184 one notch. The latch 188 will hold the disc in this position. As the 4th tongue of the transmitter TR" is on its marking side, relay 182 will not be energized and as the other four tongues of the transmitter are on their spacing side, relay 183 will not be energized. The tongue of relay 182 is connected in parallel with the upper stop of relay 183 over conductor 183' through the coil of the release magnet 187 to battery. The upper stop of relay 182 and the tongue of relay 183 are connected to ground. Thus, when either or both of the relays 182 and 183 are energized, magnet 187 will also be energized, causing the release of the disc 184 as heretofore described. As neither of the relays 182 and 183 were energized with the transmission of the first signal, the disc 184 will remain advanced one step. As the second signal is the same as the first, the tongues of the transmitter TR", those of the relays 182 and 183, and those of the polar relays 181a, 181b, 181c, 181d and 181e, will be in the same position as they were for the first signal. When the brush 159 passes over segments 192' and 193' a second time, it will cause magnet 185 to be again energized. This causes the disc 184 to be rotated one more notch. In this position of the disc 184 a pin 194 on the disc engages the tongue and closes contact 195 and causes contact 196 to be opened.

When contact 196 is open, the circuit from the local segment 197' over conductor 198 to contact 196 and from contact 196 over conductor 198', and through the coil 199 of the transmitter stepping magnet to ground, will be broken at contact 196. Thus when the brush 159 passes over and makes contact between the segments 197 and 197' the transmitter stepping magnet will not be energized.

The closing of contact 195 applies ground through this contact, conductor 195', coil 201 of the multiple contact relay CR", conductor 202, and coil of magnet 156 to battery. This energizes magnet 156 and the relay CR", thus causing the tongues of relay CR" to make contact with their lower stops and causing the release or starting of the numbering mechanism as heretofore described. The numbering mechanism then proceeds to transmit the group of predetermined signals set up by its code drums after which contact 158, Fig. 15, is closed. This completes a circuit from ground at the back stop of contact 158, through its tongue, over conductor 171 and through the coil of magnet 187, Fig. 16, to battery, causing said magnet to be energized. Magnet 187 being energized causes its armature 187' to withdraw the latch 188 and arm 186' from notches in the disc 184. This allows the disc 184 to be rotated by the action of spring 189 to its initial or stop position. With the pin 194 no longer engaging the tongue of contact 195, this contact will open and contact 196 will close by the action of their spring tongues. With contact 195 open the circuit to the relay coil 201 and the magnet 156 will be broken and the relay and magnet will be deenergized. The tongues of relay CR" will therefore return and make contact with their upper stops connecting the tongues of the transmitter to respective segments on the multiplex sending head. With magnet 156 deenergized, the numbering mechanism will be brought to a stop in its predetermined stop position. As contact 196 is closed when contact 195 is open, the circuit from segment 197' to coil 199 of the transmitter stepping magnet is restored and when the brush 159 passes over segments 197 and 197', the stepping magnet 199 will be energized, causing the perforated tape to be advanced one step. This brings the first signal of the message into the transmitter whereupon it will be transmitted in the ordinary manner.

Assume that in the message there is a signal in which the fourth pulse is marking and the other four pulses spacing, followed by a signal of any other combination of pulses. Assume that the said following combination is one in which the pulses are all spacing. Thus, on the transmission of the first mentioned signal, the fourth tongue of the transmitter will be moved to its marking side and the other tongues to their spacing side. The tongues of the polar relays 181a to 181e will be likewise positioned and as heretofore described, a circuit will be completed through the coil of the magnet 185, causing it to advance the disc 184 one step when the brush 159 passes over segments 192' and 193'. On the transmission of the following signal in which the five pulses are spacing, the fourth tongue of the transmitter and tongue of polar relay 181d will be moved to their spacing side. This completes a circuit from positive battery at the spacing bus bar of the transmitter through the coil of relay 182 to the left stop and through the fourth tongue of the transmitter to the coil of the polar relay 181d to ground. With the coil of polar relay 181d energized by a spacing current, its associated tongue makes contact with its spacing stop, breaking the circuit through the tongues and contacts of the polar relays 181a to 181e. Thus magnet 185 will not be energized when the brush 159 passes over segments 192' and 193'. As the coil 182 is energized, its associated tongue makes contact with upper stop applying ground to its tongue and over conductor 183' through the coil of magnet 187 to battery, causing said magnet to be energized. It therefore withdraws the latch 188 and arm 186' from notches in the disc 184, allowing the disc to return to its start position.

From the above description it can be seen that the numbering mechanism will be connected and transmit to the multiplex distributor only when two adjacent perforations in the tape are such that they represent two adjacent signals in which the fourth pulse of each signal are marking and all the other pulses spacing. By changing the position of pin 194 in the disc 184, one or a greater number of predetermined signals will cause the numbering mechanism to operate. Any predetermined signal or groups of signals may be used to cause the numbering mechanism to operate by making the proper changes in the connections to the tongues and contacts of the polar relays 181a, 181b, 181c, 181d, 181e and the connections to relays 182 and 193. This modified control means may also be adapted to be used in conjunction with the embodiment of the invention shown in Figs. 1 to 10.

Another modification of the invention adapted to be used in conjunction with a multiplex transmitting system and a tape transmitter in substantially the same manner as the second described modification is shown in Figs. 17 to 20. Fig. 20 includes a circuit diagram of the electrical connections in and between this modification and associated control and operating means therefor. The structural parts of this modification are substantially the same as that of the first described embodiment with the exception of the driving and transmitting means therefor. The driving means for this modification comprises a magnetically operated stepping pawl which in turn co-operates with a ratchet wheel fixed to the letters code drum shaft. The units and tens digit code drums are rotated by means of Geneva wheels and cams, as in the first embodiment. Other variations and features will be pointed out and described in the following detailed description.

Referring to Figs. 17 and 18, the sections of the machine that are broken away and not shown are substantially the same as those shown in Fig. 2. The machine differs from the first described embodiment in the driving means for the letters code drum and in the arrangement of the code pins on the letters code drums, and the electrical connections between this modification and the associated equipment are also different. In Figs. 17 and 18 a base plate 211 has attached to the ends thereof by screws 214 two vertical side plates 212 and 213, which correspond to the two side plates 19 and 20 in Fig. 2 of the first embodiment. Attached to a boss 215, Figs. 17 and 18, and a flange 216 of the base plate 211 is an angle bracket 217 which comprises the base and mounting bracket for a stepping magnet 218. The stepping magnet 218 comprises two electromagnetic coils which are attached to the bracket 217 by screws 219. On a rod 221, Fig. 18, in the left end of the bracket 217 is pivotally mounted an armature 222 which is in operative relation with the pole pieces of the magnet 218. Attached to the armature 222 is a projecting arm 223 which pivotally carried adjacent the outer end thereof, by means of a shoulder screw 224, a substantially vertical ratchet pawl 225.

A letters code drum shaft 226 pivotally supported in the plates 212 and 213, has attached for rotation therewith adjacent the right hand end thereof, a ratchet wheel 227 in operative relation with the upper end of the ratchet pawl 225. Also attached to the letters code drum shaft 226 for rotation therewith is a Geneva cam 228 and a letters code drum 229. A plurality of code pins 231 predeterminedly arranged in eight rows about the circumference of the code drum 229 and in rows along the axis thereof, are adapted to selectively actuate spring tongues 232 of a group of eight break-make contacts 233a to 233h as the code drum is rotated. The arrangement of one contact is shown in Fig. 18, the others being similarly located one behind the other, the same as the contacts 48a to 48e, 51 and 52 of the embodiment shown in Figs. 1 and 4. A developed view of the letters code drum 229 which shows the arrangement of the code pins 231 therein, is shown in Fig. 19. The Geneva cam 228, Figs. 17 and 18, is adapted to operatively engage with a Geneva wheel 234 located on a units code drum shaft 235 pivotally mounted in the plates 212 and 213. Other members, which are not shown, attached to the units code drum shaft 235, are identical with the members attached to the units code drum shaft 53 of the embodiment shown in Figs. 1 and 4, the Geneva wheel 234, Fig. 18, corresponding to the Geneva wheel 54, Fig. 4. A tens code drum shaft 236, Fig. 18, journaled in the plates 212 and 213, has attached thereto members which are identical with the members attached to the tens code drum shaft 58 shown in Fig. 4.

A flanged bushing 237, Figs. 17 and 18, held in the side plate 213 by a screw 238, has eccentrically attached thereto a shoulder screw 239 upon which is pivotally mounted a retaining pawl 241. A retractile spring 240 attached to the right hand end of the retaining pawl and to a spring post 243 in the side plate 213 keeps the retaining pawl operatively engaged with the teeth on the ratchet wheel 227. A retractile spring 250 attached to the connecting member 242, which is in turn attached to the left hand end of the shoulder screw 224, returns the armature 222, the arm 223 and the ratchet pawl 225 to their normal positions when the stepping magnet 218 is de-energized. The armature 222 and its associated mechanism are shown in their normal unoperated positions by the full lines in Fig. 18, and in their operated positions as actuated by the energization of the magnet 218 by the dotted outline thereof. A block 244 attached to the inside of the plate 213 by screws 245, has threaded therein an adjustable screw 246 which engaging with the outer end of the arm 223 of the armature in its unoperated position, limits the upward movement of said arm and ratchet pawl 225. An adjustable stop 247, the end of which is engaged by the armature 222 when operated, limits the downward movement of the ratchet pawl 225.

With the armature 222 and attached mechanism in their normal unoperated positions, the energization of the stepping magnet 218, by means hereinafter described, will cause the armature and attached mechanisms to assume their operated positions. As shown by the dotted outline thereof in Fig. 18, this allows the tip of the ratchet pawl 225 to drop down and consequently engage the next lower tooth on the ratchet wheel 227. When the magnet 218 is deenergized and the ratchet pawl is returned to its normal position by the spring 250 attached to the connecting member 242, the pawl rotates the ratchet wheel an amount equal to the distance between two consecutive teeth. Thus the ratchet wheel 227 will be rotated one tooth for every cycle of operation of the stepping magnet 218. An adjusting screw 248 in the block 244 which engages the back face of the ratchet pawl 225 in its normal position holds the pawl against the ratchet wheel 227 to prevent the ratchet wheel from rotating more than one tooth. A spring 249 attached to the arm 223 and the ratchet pawl holds the tip of the pawl against the ratchet wheel. When the ratchet pawl 225 drops down to engage a lower tooth, the retaining pawl 241 prevents rotation of the ratchet wheel 227 in a reverse direction. The ratchet wheel 227 has ten teeth thereon which is equal to the number of operating positions of the letters code drum 229. As the ratchet wheel 227 and the letters code drum 229 are both secured for rotation with the shaft 226, every time the ratchet wheel 227 is stepped a different row of code pins 231, along the axis of the code drum 229, are brought into operative relation with the tongues 232 of the contacts 233a to 233h.

The Geneva cam 228 and the Geneva wheel 234 are so arranged that the units code drum shaft 235 will be intermittently rotated or stepped one-tenth of a revolution for every complete revolution of the letters code drum shaft 226. As the members on the units and tens code drum shafts 235 and 236 respectively are exactly the same as those on the units and tens code drum shafts 53 and 58, respectively, of the first embodiment which has been hereinbefore described, they will rotate in the same manner. That is, the tens code drum shaft 236, Fig. 18, will be intermittently rotated or stepped one-tenth of a revolution for every complete revolution of the units code drum shaft 235.

This embodiment of the invention is adapted for use in a telegraph system wherein a plurality of multiplex telegraph channels are terminated in a group of jacks and a plurality of tape transmitters are represented and terminated in a group of associated jack plugs. When it is desired to send a telegraph message from a tape transmitter, its associated plug is plugged into the jack associated with the channel over which it is desired to transmit the message. Associated with each multiplex channel is one of the machines of the last described embodiment and hereinafter this machine will be referred to as the automatic transmitter or numbering machine to distinguish it from the tape transmitter. The plugging operation renders the automatic transmitter operable, whereupon it proceeds to transmit over the multiplex channel a predetermined number of signals, after which it is automatically disconnected and the tape transmitter connected to the multiplex channel. The tape transmitter then transmits to the multiplex channel the message represented in an associated perforated tape. At the end of the message a group of predetermined perforations in the tape stops the tape transmitter and the plug is then usually removed, which will render the apparatus ready for another cycle of operation. The predetermined signals this particular embodiment of the numbering machine is designed to transmit are ten in number and are as follows: (1) a blank, (2) letters shift, (3) letter F, (4) letter W, (5) letter A, (6) figure shift, (7, 8) a numeral composed of two digits, (9) letters shift, and (10) blank. The three letters F, W and A, are for designating the originating point of the message and the channel over which it is sent. These three signals together with the blank signals and printer functions are always the same and in the same order. The two digit numeral varies consecutively for consecutive messages transmitted, except as hereinafter described, and may be any numeral from 01 to 00 inclusive. This embodiment is arranged so that the initial numeral transmitted is 01.

A description of the operation of this modification with the operation of the associated and control mechanism therefor will now be given.

Referring to Fig. 20, a schematic layout of the numbering machine and the electrical connections between it and the associated equipment is shown with the various elements in their normal or unoperated positions. The segments 252 of a multiplex sending face plate are connected by a cable 253 to the tongues of associated contacts 254a to 254e of a relay 255. The upper stops of the contacts 254a to 254g are connected by a cable 256 to the seven upper spring clips of a special multiple conductor jack 257. The lower stops of contacts 254a to 254e are connected by cable 258 to the tongues of the letters contacts 233a to 233e. A special multiple conductor plug 259 is adapted to be used in conjunction with the special jack 257. The plug 259 has eleven contact segments 261a to 261k therein, the first ten of which, 261a to 261j, are adapted to make separate electrical connections to the first ten spring clips 262a to 262j of the jack 257 when the plug is inserted in the jack. The contact segment 261k and spring clip 262k are arranged to make a momentary connection therebetween only when the plug 259 is being inserted in or removed from the jack 257. The purpose of this feature will be described in following paragraphs. A cable 263 with ten conductors therein is connected to the plug 259 and when the plug is in the jack 257, these conductors are electrically connected to the ten conductors of cable 256 that terminate in the jack. The first five conductors of cable 263 are connected as shown to the tongues 264a to 264e of a tape transmitter 265 and in parallel to the coils of relays 266a to 266e, the other sides of which are connected to ground at 267. The lower stops of the letters contacts 233a to 233e are connected by a cable 268 to respective contact tongues 269a to 269e of a transfer relay 271. The lower and upper stops of contacts 269a to 269e are connected by cables 272 and 273 to the tongues of contacts 274a to 274e and 275a to 275e of the units and tens code drums 56 and 59 respectively. The back stops of contacts 275a to 275e and 274a to 274e are connected in parallel to the upper stop of contact 233f, the tongue of which is connected to battery at 276 and the lower stop thereof connected in parallel to the upper stops of contacts 233a to 233e. Other electrical connections will be described in conjunction with the operation of the apparatus.

Assume that the plug 259 is withdrawn from the jack 257 and it is desired to transmit a telegraph message from the tape transmitter 265 to a multiplex channel, which may be represented by the segments 252 of a multiplex face plate. The normal position of the various relays are as shown and the normal position of the letters code drum 229 is such that the tongues of contacts 233a to 233h are in contact with the section of the drum represented by A in Fig. 19. As there are no code pins 231 in this section of the code drum, all the contact tongues will be in contact with their lower stops. The normal positions of the units and tens code drums 56 and 59, Figs. 8 and 9 respectively, are such that an axial row of code pins on each is in operative relation with their associated contacts and may be any one of the ten positions represented by the letters A to J inclusive. It will be assumed for the cycle of operation to be described that the code drums 56 and 59 are so positioned that the code pins in the axial rows represented by the letters A and J respectively of each are in operative relation with their associated contacts.

The operation of the apparatus is initiated by inserting the plug 259 in the jack 257, which connects battery at 277 through contacts *i* of the plug and jack, over conductor 278 through the coils of the stepping magnet 218, over conductor 279 to the lower stop of contact 254*f*. As relay 255 is deenergized, the circuit will be continued through the tongue of contact 254*f* over conductor 281 to the lower stop of contact 282*a* of a relay 283. This relay is also deenergized and therefore the circuit will continue through the tongue of contact 282*a* over conductor 284 to the local segment 285 on the multiplex face plate. Thus a circuit is completed from the local segment 285 through the stepping magnet 218 to battery, and as ground is connected to the local segment 286, the stepping magnet 218 will be energized, when the local multiplex brush 287 passes over segment 285. As hereinbefore described, every operation of the magnet 218 steps the letters code drum 229 one-tenth of a revolution to bring the next row of code pins thereon into operative relation with the contacts 233*a* to 233*h*. Before the plug 259 is inserted in the jack 257, the sending brush 288 passing over the segments 252 causes to be transmitted to the sending line a code combination of impulses which represents a blank. This combination of impulses being one in which all the impulses are spacing or intervals of no-current, it is set up on the segments 252 through the contacts 254*a* to 254*e* of relay 255 from the tongues of contacts 233*a* to 233*e*. It is evident from Fig. 20 that when relay 255 is deenergized and contacts 233*a* to 233*f* are in contact with their lower stops, intervals of no-current will be transmitted from the segments 252 for every revolution of the brush 288. The first pulse from the local segment 285 after inserting the plug 259 in the jack 257 causes the letters code drum to be stepped one position to bring the code pins in the B position into engagement with their associated contacts. This places the tongues of contacts 233*a* to 233*e* in contact with their upper stops and as the upper stops are connected to battery through contact 233*f*, battery will be applied to the segments 252. Thus, as the brush 288 subsequently passes over the segments 252, the combination of impulses represented by the code pins 231 in the B position of the code drum 229 will be transmitted to the line. In the same manner the combinations of impulses represented by the code pins 231 in positions C, D, E and F are transmitted to the line. The brush 287 is arranged to pass over the local segment 285 during the time the sending brush 288 is passing over the segments associated with another channel of the multiplex; thus the stepping of the letters code drum 229 does not interfere with the transmission of the signals therefrom.

After the transmission of the impulses represented by the F position of the code drum 229, it is stepped into its G position which brings the two code pins in this position into contact with the tongues of their associated contacts 233*f* and 233*g*. This causes the tongues of these two contacts to break away from their lower stops and make contact with their upper stops and as will be hereinafter described, causes the combination of impulses set up in the tens code drum 59 to be transmitted to the multiplex segments 252. The operation of contact 233*f* connects battery at 276 through the tongue and upper stop thereof over conductor 289 to the upper stops of contacts 274*a* to 274*e* and 275*a* to 275*e*. The operation of contact 233*g* connects battery at 291 through its upper stop and tongue, over conductor 292 through the coil of relay 271 to ground, whereupon relay 271 is energized, causing the tongues of contacts 269*a* to 269*e* to make contact with their upper stops. Thus, five individual circuits are completed from the tongues of contacts 275*a* to 275*e* over cable 273, through the upper stops and tongues of contacts 269*a* to 269*e*, over cable 268, through the lower stops and tongues of contacts 233*a* to 233*e*, over cable 258, through the lower stops and tongues of contacts 254*a* to 254*e* and thence over cable 253 to the segments 252. It will be apparent that when any of the contacts 275*a* to 275*e* are closed, battery will be applied to their associated segments on the multiplex face plate and thus on the subsequent revolution of the brush 288, the code combination of impulses represented by the axial row of code pins in the tens code drum 59 in operative relation with the contacts 275*a* to 275*e* will be transmitted to the line.

The next revolution of the local brush 287 causes the stepping magnet 218 to step the letters code drum 229 so that its H position is in operative relation with the contacts 233*a* to 233*h*. In this position a code pin will close contact 233*f* to keep the battery 273 applied to the stop of contacts 274*a* to 274*e* and 275*a* to 275*e*. As there is no pin in the H position to operate the contact 233*g*, therefore relay 271 will be deenergized, and consequently the tongues of contacts 269*a* to 269*e* will return to their lower stops, and thus five individual circuits will be completed from the tongues of contacts 274*a* to 274*e* to associated segments 252 on the face plate. The next revolution of the brush 288 thus transmits the combination of impulses represented by the axial row of code pins in the units code drum 56 in operative relation with the contacts 274*a* to 274*e* to the multiplex circuit. The following contact of the brush 287 with the segment 285 causes the letters code drum to be stepped to bring its I position into operative relation with the contacts 233*a* to 233*h*. As there is no pin in this position to operate the tongue of contact 233*f*, it will return to its lower stop and reapply battery to the upper stops of contacts 233*a* to 233*e*. Thus, as the contacts 233*a* to 233*e* are actuated by the code pins in the I position of the code drum 229, corresponding segments 252 will have battery applied to them and as the brush 288 subsequently passes over these segments, the associated signals corresponding to the letters shift will be transmitted to the line. The next stepping impulse causes the code drum 229 to be stepped to bring its J position into operative relation with the contacts 233*a* to 233*h* and as the armature 223 is returning to its normal position after the following or tenth stepping impulse to the stepping magnet, the pawl 225 steps the code drum from its J position into its A or initial position and in so doing causes a special pin 293 in the letters code drum between the J and A positions to operate the contact 233*h* so that the tongue momentarily makes contact with its upper stop. This applies battery at 294 through the tongue and upper stop of contact 233h over conductor 295, through the coil of relay 255, through a key 296, which is normally closed, to ground at 297. Thus the relay 255 will be energized and operate the tongues of contacts 254a to 254g to make contact with their upper stops which completes five individual circuits from the multiplex segments 252 over cable 253 through the tongue and upper stops of contacts 254a to 254e, over cable 256, through the jack 257 and plug 259 to the tongues of the tape transmitter 264a to 264e and breaks the circuits from the tongues of contacts 233a to 233e to the multiplex segments. Battery at 298 is connected to the marking bus bar of the tape transmitter and as the tongues thereof are actuated in various combinations, associated segments 252 of the multiplex face plate will have battery applied to them. As the tongue of contact 254f makes contact with its upper stop, the circuit from the local segment 285 to the coils of the stepping magnet 218 is broken and a circuit is completed from the segment 285 to the tongue of contact 254f, as heretofore described, through the upper stop of contact 254f, over cable 256, through the jack 257 and plug 259, through the tongue and stop of contact 299, over conductor 301, through the coil of relay 302, over conductor 303, and thence through the coil of the operating magnet 304 of the tape transmitter 265 to battery at 305. Thus subsequent revolutions of the brushes 287 and 288 operate the tape transmitter and transmit to the multiplex circuit signals from said transmitter. A locking circuit is provided for the relay 255 from battery at 306 through the plug and jack, over cable 256 through the upper stop and tongue of contact 254f through the coil of relay 255 to ground whereby said relay is maintained energized until the plug is withdrawn from the jack.

During the time that the stepping impulses are causing the letters code drum 229 (Figs. 17, 18 and 20) to be stepped from its A to its F position, the Geneva cam 228 rotating therewith engages the Geneva wheel 234 and rotates the units code drum 56 one-tenth of a revolution to bring the next axial row of pins into operative relation with the contacts 274a to 274e. At a predetermined time in the rotation of the units code drum 56, the Geneva cam attached to the units shaft 235 engages the Geneva wheel 236 to rotate it one-tenth of a revolution. The arrangement of the pins on the units and tens code drums is such that for successive positions thereof successive axial rows of pins representing numerals 1, 2, 3 ... 9, 0 are in operative relation with their associated contacts. The rotation of the two drums cooperates with the rows of pins so that the combined two signals transmitted from their associated contacts represent numerals 01, 02, 03, ... 99 to 00 inclusive. All three of the code drums 229, 56 and 59 are adapted to be positioned at times when their respective contacts are not connected directly to the multiplex segments. Thus the breaking up of signals during the transmission therefrom is prevented.

From the above description it is evident that when the plug 259 is inserted in the jack 257, the numbering machine is started and transmits to the line a group of six predetermined signals, then two variable signals representing numerals which are consecutive for consecutive cycles of operation of the machine which are in turn followed by two more predetermined signals. The machine is then stopped and disconnected from the sending line and the tape transmitter connected, whereupon it proceeds to transmit the telegraph message. At the end of the message the tape transmitter is stopped by means to be hereinafter described and the plug is then usually removed from the jack, rendering the multiplex channel available to receive messages from other transmitters through their associated plugs.

In the system adapted to operate in conjunction with this modification, each message in a perforated tape is followed by a group of two special signals added to the message by the operator, for example. These signals, by means to be described hereinafter, cause the tape transmitter to stop, whereupon the operator may remove the plug from the jack. This feature is important where more than one message may be recorded on the tape and awaiting transmission at the same time.

A description of the means used to stop the tape transmitter will now be given. As is well known to those versed in the art, a tape transmitter is provided with contact tongues which make contact with bus bars in various combinations which represent the perforations in the tape passing through the tape transmitter. In the tape transmitter used in conjunction with this modification only the marking bus bar has battery connected to it. Thus, when any of the tongues 264a to 264e make contact with the marking bus bar, battery will be applied through the tongues to associated individual parallel circuits which comprise the coils of the relays 266a to 266e and the segments 252 of the multiplex face plate, as shown in Fig. 20. As the other sides of the coils of relays 266a to 266e are connected to ground, said relay will be operated in combinations representative of the positions of the tape transmitter tongues and as the brush 288 wipes over the segments 252, combinations of impulses also representative of the positions of the tape transmitter tongues will be sent to the line. As the local brush 287 subsequently wipes over the local segment 285, a circuit is completed through the tape transmitter operating magnet 304 and the operation thereof causes the tape to be advanced to allow another combination of perforations therein to be represented by the tongues 264a to 264e in the tape transmitter. It should be understood, however, that as heretofore described the tape transmitter will operate only after the numbering machine has completed its cycle of operation. The coil of magnet 302 is in series with the coil of magnet 304; thus it will also be energized every time the local brush 287 wipes over the local segment 285.

An armature 307, pivoted at 308, is adapted to be operated by the magnet 302. Pivotally attached to the top of the armature 307 is a pawl 309 which is in operative relation with a toothed disc 311. Thus every operation of the magnet 302 causes the disc 311 to be stepped one tooth. A release magnet 312 has in operative relation therewith an armature 313 which is pivoted at 314. A latch 315 pivotally mounted on the armature 313 has the lower end thereof in operative relation with the disc 311 and acts to hold the disc in its stepped position.

The special signals in the tape that are adapted to stop the tape transmitter 265 are two like consecutive signals in which the first, second, third and fifth impulses are marking and the fourth spacing. As shown in Fig. 20, the tongues 318 and stops 319 of relays 266a to 266e are so connected that for any combination of settings thereof other than that set by the special signal, a circuit will be completed from battery at 316 through the coil of relay 312, over conductor 317 through one of the tongues 318 and one of the stops 319 of the relays 266a to 266e, over the tenth conductor of cable 263, through the plug 259 and jack 257, over the tenth conductor of cable 256 to a local segment 321. The brush 287 is adapted to wipe over segment 321 after the energization of magnets 302 and 304 and while the magnets 266a to 266e are energized. Thus in conjunction with every signal transmitted from the tape transmitter, other than the above mentioned special signal, the magnet 312 will be energized. The energization of magnet 312 causes its armature 313 to remove the latch 315 from operative relation with the ratchet disc 311. A link 322 pivotally attached to the ends of the armature 313 and pawl 309 causes the pawl 309 also to be removed from operative relation with the ratchet disc 311. A restoring spring 323 attached to the disc 311 is thereupon operative to return the disc to its normal or starting position. A pin 324 in the disc 311 adapted to contact with a stop 325 determines the normal position of the disc. Whenever the special signal is represented by the settings of the tongues 318, the above described circuit will not be complete from the segment 321 to battery at 316 and consequently for the accompanying rotation of the brush 287 the magnet 312 will not be energized. Thus the disc 311 will remain in its stepped position and be advanced another tooth by the stepping pulse of the next signal. If the next signal happens to be any one except the special signal, the tongues 318 will be set to allow the completion of the circuit from segment 321 through the magnet 312 to battery at 316. Thus the magnet 312 will be energized and allow the disc 311 to be returned to its normal position as heretofore described. If the second signal happens to also be a special signal, the magnet 312 will not be energized and the disc 311 will therefore be stepped two teeth. With the disc 311 stepped two teeth, a pin 326 therein causes the contact 299 to be opened and break the circuit to the magnets 302 and 304. Thus subsequent revolutions of the brush 287 will not operate the transmitter or cause the magnet 312 to be operated because until the magnet 304 is operated, the relays 266a to 266e break the circuit to the magnet 312.

When the tape transmitter 265 stops, the operator removes the plug 259 from the jack 257. This operation momentarily closes the circuit of the magnet 312 through the contacts k of the plug and jack and the energization thereof causes the disc 311 to be returned to its normal position. It also breaks the locking circuit from battery at 306 through the relay 255 to ground at 297 which allows the relay 255 to be deenergized and to reconnect the numbering machine to the multiplex segments. The tape transmitter and numbering machine are thus restored to their normal positions ready for another cycle of operation.

If two consecutive messages in a perforated tape running through a tape transmitter are destined to be transmitted over the same multiplex channel, it is not necessary to remove and replace the plug between messages. The special signals following the first message will stop the tape transmitter, whereupon the operator operates the key 296. This breaks the locking circuit of the relay 255, whereupon it returns to its normal position and renders the numbering machine operable for another cycle of operation which is the condition of the machine when the plug was originally inserted in the jack. The numbering machine then proceeds to operate as it did for the first described cycle, the numeral transmitted being consecutive with the previous numeral transmitted. The operation of key 296 also applies ground to the circuit through the magnet 312 and causes the disc 311 to be returned to its normal position.

At times it may be desirable to set the numbering machine so that the next message transmitted over its associated channel will be numbered 01 regardless of the number of the preceding message. The resetting of the units code drum is accomplished by closing the key 327, causing the energization of relay 283, which completes a circuit from the local segment 285 over conductor 284 through the tongue and upper stop of contact 282a, over conductor 328, through contact 274f, over conductor 329, through the coils of the stepping magnet 218 and then over conductor 331 through the upper stop and tongue of contact 282b to battery at 330. Thus as long as the key 327 is held closed, stepping pulses from the local segment of the distributor go to the stepping magnet of the numbering machine and cause it to rotate the drums until a pin 60f on the units code drum 56, Fig. 8, opens the contact 274f and breaks this circuit to the stepping magnet. The pin 60f is so placed that it will open said circuit when the letters code drum 229 is in its normal or rest position and the units code drum 56 in a position so that the next signal transmitted therefrom will represent the desired numeral, for example, the numeral 1. The tens code drum 59 is manually positioned, as described in the first embodiment, so that the next signal transmitted therefrom will represent the numeral 0. Thus, the next cycle of operation of the machine will cause its associated message to be numbered 01.

It is the usual practice in telegraph systems to transmit impulses of positive and negative current over multiplex channels; therefore, a neutral relay 332 is connected to the solid ring 334 of the multiplex face plate. The signals are thus converted from combinations of current and no-current intervals to corresponding combinations of positive and negative current impulses.

It is obvious, of course, that various other modifications of the apparatus and circuits shown and described herein may be made without departing from the spirit or essential attributes of the invention, and therefore, we do not desire to be limited to the specific details shown and described.

What is claimed is:

1. In combination, a telegraph transmitter, a sending circuit, an auxiliary telegraph transmitter, means for operating said auxiliary transmitter alternately with said first transmitter, said auxiliary transmitter comprising a rotatable distributor, a plurality of rotatable code drums, a plurality of contact groups associated with said code drums, means carried by said code drums to operate contacts of said contact groups in a predetermined arrangement whereby a plurality of signal codes are set up in said contact groups, means for varying a part of said signal codes for successive operations of said auxiliary transmitter, and means for selectively connecting said contact groups to said distributor.

2. A telegraph transmitting apparatus having an operating cycle wherein a plurality of signal code combinations are transmitted comprising a rotatable distributor for distributing said signal code combinations, a plurality of rotatable members, contact groups associated with each of said rotatable members, contact actuating means arranged in a predetermined order and carried by said rotatable members to operate said associated contact groups, means for connecting said contact groups to said distributor in a predetermined order, and means for varying in a predetermined order a part of the signals transmitted by said transmitter.

3. A printing telegraph transmitting mechanism having an operating cycle in which a plurality of groups of signal code combinations are transmitted, said mechanism comprising a plurality of rotatable code drums normally tending to rotate, a plurality of groups of contacts associated with said code drums, means carried by said code drums to actuate said contacts, means to control the rotation of said code drums whereby a predetermined part of said signal code combinations are varied in accordance with a predetermined arrangement for each cycle of operation, a sending circuit and means for sequentially connecting said contact groups to said sending circuit.

4. In a printing telegraph transmitter having an operating cycle composed of a plurality of sub-cycles, in each of which a plurality of signal code combinations are transmitted, said transmitter comprising a rotatable distributor having a plurality of code drums, a plurality of contact groups associated with said code drums, means carried by said code drums to operate contacts of said contact groups in a predetermined arrangement whereby a plurality of signal code combinations are set up in said contact groups, means for varying a part of said code combinations for successive sub-cycle operations of said transmitter, and means for restoring said transmitter to the start position of the first mentioned operating cycle.

5. In combination, a sending circuit, a printing telegraph transmitter normally connected thereto, an auxiliary transmitter having a definite operating cycle in which a predetermined number of code signals are invariably transmitted in each cycle of operation thereof, means for stopping the operation of one transmitter whenever the other transmitter is connected to said sending circuit, means controlled by predetermined signals in said first transmitter to disconnect said first transmitter from said sending circuit and to connect said auxiliary transmitter thereto, and means for reconnecting said first transmitter to said sending circuit and disconnecting said auxiliary transmitter therefrom at the completion of the operating cycle of said auxiliary transmitter.

6. In combination, a telegraph transmitter, a sending circuit, an auxiliary mechanism, means comprising said auxiliary mechanism for automatically interposing and transmitting before message groups of signals from said transmitter a group of service signals of predetermined character, means for automatically varying a part of said service signals in a predetermined arrangement and means for simultaneously rendering either said transmitter or auxiliary mechanism nonoperative and the other operative.

7. In combination, a telegraph distributor, an associated tape transmitter, an auxiliary transmitter normally connected to said distributor, a multiple conductor plug and associated multiple conductor jack, a perforated tape associated with said tape transmitter, means operative on the insertion of said plug in said jack to initiate the operation of said auxiliary transmitter whereupon said auxiliary transmitter transmits to said distributor a predetermined number of signals, means operative by said auxiliary transmitter after the transmission of said signals to disconnect the same from said distributor and connect said tape transmitter, means operative thereafter whereby said tape transmitter transmits to said distributor code combinations of signals representative of perforations in said tape, means controlled by the transmission of signals by said tape transmitter representative of a predetermined arrangement of perforations in said tape whereby the operation of said tape transmitter is stopped and means operative upon the removal of said plug from said jack to return the transmitters to normal.

8. In combination, a multiplex distributor, an associated tape transmitter, an auxiliary transmitter normally connected to said distributor, a multiple conductor plug and associated multiple conductor jack, a perforated tape associated with said tape transmitter, means operative on the insertion of said plug in said jack to initiate the operation of said auxiliary transmitter whereupon said auxiliary transmitter transmits to said distributor a predetermined number of service signals, means operative by said auxiliary transmitter after the transmission of said service signals to disconnect the same from said distributor and connect said tape transmitter, means operative thereafter whereby said tape transmitter transmits to said distributor code combinations of signals representative of perforations in said tape, means controlled by the transmission of signals by said tape transmitter representative of predetermined perforations in said tape whereby the operation of said tape transmitter is stopped, means operative upon the removal of said plug from said jack to return the mechanisms to normal, and means for varying the service signals transmitted by said auxiliary transmitter for successive cycles of operation thereof.

9. In combination, a multiplex distributor, a tape transmitter, a tape associated with said tape transmitter, an auxiliary transmitter, means to initiate the operation of said auxiliary transmitter, means to disconnect said auxiliary transmitter from said distributor and simultaneously connect said tape transmitter thereto and means controlled by the transmission of signals representative of a predetermined arrangement of perforations in said tape whereby said tape transmitter is stopped.

10. In combination, a multiplex distributor, an associated tape transmitter, an auxiliary transmitter for transmitting service signals normally connected to said distributor, a perforated tape for said tape transmitter, means to initiate the operation of said auxiliary transmitter, means to automatically disconnect said auxiliary transmitter from said distributor and connect said tape transmitter thereto, means operative thereafter whereby said tape transmitter transmits to said distributor, means controlled by the transmission of signals representative of a predetermined number of perforations in said tape whereby the operation of said tape transmitter is stopped, means operable after the stopping of said tape transmitter to disconnect said tape transmitter from said distributor and connect said auxiliary transmitter thereto whereupon the conjoined cycles of operation of said transmitters are repeated, and means for varying the service signals transmitted from said auxiliary transmitter.

11. In combination, a telegraph message transmitter, a sending circuit, an auxiliary transmitter, means for automatically controlling the operation of said transmitters whereby said auxiliary transmitter transmits to said sending circuit a plural number of service signals with each message group of signals transmitted from said message transmitter, means for varying said service signals for each operation of said auxiliary transmitter and means for rendering each of said transmitters inoperative during the operation of the other.

12. In combination, a telegraph message transmitter, a sending circuit, an auxiliary transmitter, means for controlling the operation of said transmitters whereby said auxiliary transmitter transmits to the sending circuit a predetermined number of service signals comprising representations of numerals, letters and printer functions appended to each message group of signals transmitted from said message transmitter, and means whereby the service signals representing numerals are automatically varied in consecutive numerical order for each conjoined operation of said transmitters during the operation of said auxiliary transmitter.

13. In combination, a multiplex distributor, an associated tape transmitter, an auxiliary transmitter, a perforated tape, means to initiate the operation of said auxiliary transmitter, means to stop the operation of said auxiliary transmitter, means operative thereafter whereby said tape transmitter transmits to said distributor code combinations of signals representative of perforations in said tape, means whereby the operation of said tape transmitter is stopped, and means operative after the stopping of said tape transmitter whereupon the conjoined cycles of operation of said transmitter may be repeated.

14. In combination, a telegraph message transmitter, a sending circuit, an auxiliary transmitter, means whereby said auxiliary transmitter transmits to said sending circuit a predetermined number of service signals comprising representations of numerals, letters and printer functions accompanying the transmission of each message from said message transmitter, means whereby the service signals representing numerals are automatically varied in consecutive numerical order for each conjoined operation of said transmitters and means for rendering either of said transmitters inoperative during the operation of the other.

15. A cyclically operable automatic telegraph transmitter for transmitting groups of code combinations of signals representative of numerals during each cycle of operation and means operative by said transmitter for automatically varying said numeral representations in consecutive numerical order for each cycle of operation of said transmitter.

16. In combination, a telegraph distributor, a telegraph message tape transmitter normally connected to said distributor, a perforated tape adapted to control the transmission of code combinations of signals from said message transmitter, an auxiliary transmitter having an operating cycle in which a plurality of code combinations of signals are transmitted, means controlled by the transmission of signals representative of a predetermined number of predetermined perforations in said tape whereby the operation of said tape transmitter is halted simultaneously with the initiation of the operation of said auxiliary transmitter, the disconnecting of said tape transmitter from said distributor and the connecting of said auxiliary transmitter thereto, means whereby said auxiliary transmitter then operates through one cycle of operation and means operative thereafter to return said transmitters to normal.

17. In combination, a sending circuit, a tape transmitter, an auxiliary transmitter having an operating cycle in which a predetermined number of code combinations of signals are transmitted, said signals comprising representations of printer functions and numerals, means to sequentially connect said transmitters to said sending circuit and means for automatically varying during the operation thereof the numeral representative signals of said auxiliary transmitter in consecutive numerical order for consecutive cycles of operation thereof.

18. In combination, a multiplex distributor, a telegraph message transmitter normally connected to said distributor, a perforated tape, an auxiliary transmitter having an operating cycle in which a plurality of code combinations of signals are transmitted, means controlled by perforations in said tape whereby the operation of said message transmitter is halted simultaneously with the initiation of the operation of said auxiliary transmitter, the disconnecting of said message transmitter from said distributor and the connecting of said auxiliary transmitter thereto, means whereby said auxiliary transmitter then operates through one cycle of operation and means for varying according to a predetermined arrangement a part of the signals transmitted from said auxiliary transmitter.

19. In combination, a sending circuit, a perforated tape, the perforations in which represent a plurality of messages separated by a plurality of predetermined perforations, a tape transmitter for said tape normally connected to said sending circuit, an auxiliary transmitter having an operating cycle in which a predetermined number of code combinations of signals are transmitted, means controlled by said predetermined perforations for disconnecting said tape transmitter from said sending circuit and connecting said auxiliary transmitter thereto, means whereby said auxiliary transmitter then operates through one cycle of operation, means operative thereafter to disconnect said auxiliary transmitter from said sending circuit and reconnect said tape transmitter thereto and means for automatically varying a part of the signals from said auxiliary transmitter in consecutive numerical order for consecutive cycles of operation.

20. In combination, a sending circuit, a perforated tape, the perforations in which represent a plurality of messages separated by a plurality of predetermined perforations, a tape transmitter for said tape normally connected to said sending circuit, having an operating cycle the length of which is determined by the interval between said predetermined perforations in said tape, an auxiliary transmitter having an operating cycle in which a predetermined number of code combinations are transmitted, said signals comprising in part representations of numerals, means controlled by said predetermined perforations whereby said tape transmitter is disconnected from said sending circuit and said auxiliary transmitter connected thereto, means whereby said auxiliary transmitter operates through one cycle of operation, means operative thereafter to disconnect said auxiliary transmitter from said sending circuit and reconnect said tape transmitter whereupon said tape transmitter operates through another cycle of operation and means for varying said part of the signals from said auxiliary transmitter.

21. In combination, a tape transmitter, a distributor, an auxiliary transmitter normally connected to said distributor having an operating cycle in which a plurality of signals are transmitted, manually controlled means to initiate the operation of said auxiliary transmitter, means controlled by said auxiliary transmitter at the end of a cycle of operation thereof to stop and disconnect the same from distributor and connect said tape transmitter to said distributor and initiate the operation thereof, means controlled by the first mentioned means to stop the operation of said tape transmitter, and means for automatically varying during the operating cycle thereof a predetermined part of the signals of said auxiliary transmitter representing numerals in consecutive numerical order for successive cycles of operation.

22. In combination, a sending circuit, a perforated tape, a normally inoperative tape transmitter comprising means for distributing to said sending circuit code combinations of impulses representative of perforations in said tape, an auxiliary transmitter normally connected to said sending circuit having an operating cycle in which a predetermined number of signals are transmitted to said sending circuit, a multiple conductor plug and associated multiple conductor jack, means operative on the insertion of said plug in said jack to initiate the operation of said auxiliary transmitter for one cycle of operation, means operative by said auxiliary transmitter to stop and disconnect the same from said sending circuit after one cycle of operation and simultaneously connect said tape transmitter to said sending circuit and render the same operative to transmit code combinations of signals representative of perforations in said tape and means operative on the removal of said plug from said jack to restore the transmitters to normal.

23. In combination, a sending circuit, a perforated tape, a normally inoperative tape transmitter, an auxiliary transmitter normally connected to said sending circuit having an operating cycle in which a predetermined number of signals are transmitted, means to initiate the operation of said auxiliary transmitter for one cycle of operation, means operative by said auxiliary transmitter to stop and disconnect the same from said sending circuit after one cycle of operation and simultaneously connect said tape transmitter to said sending circuit and render the same operable, means operative thereafter to restore the transmitters to normal, means for rendering each of said transmitters inoperative during the operation of the other and means for automatically changing a predetermined portion of the signals transmitted by said auxiliary transmitter whereby said signals represent numerals varying in consecutive numerical order for consecutive cycles of operation thereof.

24. In combination, a sending circuit, a perforated tape, a normally inoperative tape transmitter, an auxiliary transmitter normally connected to said sending circuit having an operating cycle in which a plurality of signals are transmitted, means to initiate the operation of said auxiliary transmitter for one cycle of operation, means operative thereafter to disconnect the same from said sending circuit and simultaneously connect said tape transmitter thereto and render the same operable and means for automatically changing during the operating cycle thereof a portion of the signals of said auxiliary transmitter.

25. In an apparatus for transmitting code combinations of electrical impulses comprising a plurality of transmitting contacts, actuating means for said contacts, a plurality of groups of secondary contacts, means comprising a plurality of rotatable drums for actuating said secondary contacts in a predetermined arrangement, means for sequentially connecting said secondary contact groups to said transmitting contacts and means for rotating said drums.

26. In a telegraph transmitting apparatus having an operating cycle wherein a definite number of code combinations of electrical impulses are transmitted, a plurality of transmitting contacts, a plurality of groups of secondary contacts, a plurality of associated code drums, means carried by said drums to operate said contacts, means for connecting said secondary contact groups to said transmitting contacts in a predetermined cyclic order, and means for positioning said drums whereby for a predetermined number of cycles of operation of said apparatus each group of electrical impulses transmitted therefrom are varied.

27. In a telegraph mechanism for transmitting code combinations of impulses comprising selecting and synchronizing impulses, a distributor mechanism comprising a plurality of current controlling contacts and actuating means therefor, means comprising a plurality of rotatable drums and associated contact groups for setting up in said transmitting contacts a plurality of code combinations, said code combinations to represent in part numerals, means for positioning said drums whereby said code combinations representing numerals vary in consecutive numerical order for consecutive cycles of operation of said mechanism, means for initiating the operation of said mechanism and means controlled by said mechanism to stop the operation thereof after each cycle of operation.

28. In a telegraph apparatus for transmitting a predetermined number of code combinations of impulses representative of letter characters, printer functions and figure characters for each cycle of operation thereof, means whereby impulses representative of said letter characters and said printer functions are retransmitted for every operation of said apparatus and means whereby said impulses representative of said figure characters are automatically varied in consecutive numerical order for consecutive cycles of operations of said apparatus.

29. In a telegraph apparatus for transmitting code combinations of impulses including representations of figures, means for automatically varying said figure representations in consecutive numerical order for consecutive operations of said apparatus and means for restoring the apparatus to normal when desired whereby the subsequent figure representation transmitted represents a predetermined numeral.

30. In combination, a distributor mechanism, a transmitter comprising a series of rotatable drums normally tending to rotate, a plurality of groups of contacts associated with said drums, means carried by said drums to actuate said contacts in a prearranged order and means for releasing said drums in timed relation to the operation of said distributor mechanism.

31. In a telegraph transmitter having an operating cycle in which signals comprised of continuous successions of groups of solely character selecting conditions are transmitted, means for automatically varying a portion of said character selecting conditions according to a predetermined arrangement during the operation of said transmitter, manually operated means to initiate the operation of said transmitter for one cycle of operation and means to stop the operation of said transmitter at the completion of every operating cycle.

32. In a telegraph transmitter having an operating cycle in which a predetermined number of signals are transmitted, each of which comprises successive groups of solely character selecting conditions, means for varying a portion of said character selecting conditions according to a predetermined arrangement, concomitantly with every cycle of operation thereof, a perforated tape, automatically operated means including said perforated tape to initiate the operation of said transmitter and a second automatically operated means to stop the operation of said transmitter at the completion of every cycle of operation.

33. In a telegraph transmitting device, first, second and third rotatable members, individual contact groups associated with each of said rotatable members, means carried by said rotatable members to actuate said contacts, means comprising an electromagnet, a ratchet wheel and associated pawl for rotating said first rotatable member, means to energize said electromagnet to move said first rotatable member step by step, means controlled by said first rotatable member to render said electromagnet inoperative after a predetermined number of operations thereof and means comprising Geneva wheels and cams cooperating with said first rotatable member for stepping said second and third rotatable members.

34. In a telegraph transmitter, a series of rotatable drums, a plurality of groups of associated contact members, means carried by said drums to actuate said contact members and means for rotating each of said drums in a predetermined timed relation to the other drums whereby said contact members are actuated to transmit permutation code signals.

35. In a telegraph transmitter, means for transmitting groups of code combinations of impulses representative of messages, means for adding to said groups additional groups of impulses of predetermined character and means for automatically varying said additional groups of impulses in accordance with a predetermined plan whereby said added signals accompanying different messages are different.

36. A telegraph transmitter for transmitting permutation code signals comprising a plurality of rotatable members having a plurality of operating positions, contact members associated with said drums whereby said code signals are transmitted, means carried by said drums whereby said contact members are selectively actuated for each operative position of said rotatable members and means for rotating said rotatable members whereby said contact members are actuated to vary the code signals transmitted therefrom.

37. In a transmitting device for sending permutation code signals, a series of primary contacts, a primary rotatable member having an operating cycle in which said primary contacts are sequentially actuated, a plurality of series of secondary contacts, a plurality of secondary rotatable members each having a plurality of operating positions in which said secondary contacts are selectively actuated, means for rotating said primary rotatable member from a normal position, means for stepping said secondary rotatable members in a predetermined arrangement for every cycle of operation of said primary rotatable member and means for returning said primary rotatable member to normal after a predetermined number of cycles of operation.

38. In a telegraph transmitting device for transmitting message groups of signals, means comprising a plurality of rotatable drums and a plurality of series of associated contact members for automatically interposing signals of predetermined character into each of said message groups of signals and means for rotating said drums to vary said interposed signals in a predetermined manner.

39. In a telegraph device having a main cycle of operation and a sub-cycle of operation, means whereby message signals are transmitted in said main cycle of operation, means whereby a predetermined number of signals representative of designating characters are transmitted in each of said sub-cycle of operation, means whereby said sub-cycle of operation is automatically operative following the operation of said main cycle of operation and means for varying the signals of said sub-cycle of operation in a predetermined manner for each of the conjoined cycles of operation of said telegraph device.

40. A telegraph transmitter having an operating cycle in which a plurality of code signals are transmitted, said transmitter comprising a rotatable distributor provided with contacts, a plurality of code drums, a plurality of code pins carried by said drums, said pins being arranged in accordance with the signal code to represent predetermined signals, a plurality of groups of contacts operable by said code pins, means for selectively and electrically connecting predetermined of said groups of contacts to said distributor contacts, means for rotating said code drums to set up signals successively in associated contact groups, whereby a part of said signals represent figures, and means for varying said figure signals consecutively for consecutive cycles of operation of said transmitter.

41. In combination, a printing telegraph transmitter, a sending circuit, an auxiliary transmitter, said auxiliary transmitter comprising a rotatable distributor, a plurality of rotatable code drums, a plurality of contact groups associated with said code drums, means carried by said code drums to operate said contacts in a predetermined order, and means for selectively connecting said groups of contacts to said distributor.

42. In combination, a sending circuit, a printing telegraph transmitter normally connected to said sending circuit, an auxiliary printing telegraph transmitter having an operating cycle in which a plurality of code signals including figure code signals are automatically transmitted, said auxiliary transmitter comprising a rotatable distributor, means for varying said figure code signals consecutively for consecutive cycles of operation of said auxiliary transmitter and means for automatically disconnecting said telegraph transmitter from said sending circuit, and connecting said auxiliary transmitter thereto during the operation of said auxiliary transmitter.

43. In a printing telegraph transmitter, circuit-controlling elements movable from an initial position through a definite cycle, means including said elements for transmitting a plurality of signal code combinations for each cycle of operation and means for varying a part of said signal code combinations in accordance with a predetermined arrangement, for each cycle of operation of said transmitter.

44. In combination, a sending circuit, a transmitting mechanism comprising a rotatable distributor and associated transmitting contacts, a plurality of groups of auxiliary contacts associated with said transmitting contacts, means for actuating said auxiliary contacts to set up signal code representations in same, means for transferring said code representations in a predetermined sequence to said transmitting contacts, means for transmitting said signal code representations to said sending circuit and means for varying a part of said signal code representations.

45. In combination, a telegraph transmitter, a sending circuit, a control means, an auxiliary transmitter normally non-operative and connected to said sending circuit, said auxiliary transmitter having an operating cycle in which a plurality of signal code combinations are transmitted, means for connecting said first transmitter to said control means, means operable by said control means for rendering said auxiliary transmitter operative and said first transmitter non-operative upon the connection of said first transmitter to said control means, means for rendering said auxiliary transmitter non-operative, disconnecting the same from said sending circuit and rendering the same operative at the completion of said cycle of said auxiliary transmitter, and means for restoring said auxiliary transmitter to its normal condition when said first transmitter is disconnected from said control means.

46. In combination, a multiplex distributor and associated tape transmitter, an auxiliary transmitter normally connected to said distributor, a multiple conductor plug and associated multiple conductor jack, a perforated tape, means to initiate the operation of said auxiliary transmitter, means to disconnect the same from said distributor and connect said tape transmitter, means operative thereafter whereby said tape transmitter transmits to said distributor, means controlled by the transmission of signals representative of predetermined perforations in said tape whereby the operation of said tape transmitter is stopped, means operable on the removal of said plug from said jack to return the transmitters to normal and means for varying the signals transmitted from said auxiliary transmitter for successive cycles of operation thereof.

47. In combination, a multiplex distributor, an associated tape transmitter, an auxiliary transmitter normally connected to said distributor, a multiple conductor plug and associated multiple conductor jack, a perforated tape associated with said tape transmitter, means operative on the insertion of said plug in said jack to initiate the operation of said auxiliary transmitter whereupon said auxiliary transmitter transmits to said distributor a predetermined number of service signals, means operative by said auxiliary transmitter after the transmission of said service signals to disconnect the same from said distributor and connect said tape transmitter, means operative thereafter whereby said tape transmitter transmits to said distributor code combinations of signals representative of perforations in said tape, means controlled by the transmission of signals by said tape transmitter representative of predetermined perforations in said tape whereby the operation of said tape transmitter is stopped, means operative upon the removal of said plug from said jack to return the mechanisms to normal, manually controlled means operable after the stopping of said tape transmitter and before the removal of said plug from said jack to disconnect said tape transmitter from said distributor and connect said auxiliary transmitter thereto whereupon the conjoined cycles of operation of said auxiliary transmitter and said tape transmitter are repeated and means for varying the service signals transmitted from said auxiliary transmitter for successive cycles of operation thereof.

48. In combination, a telegraph distributor, a telegraph message tape transmitter normally connected to said distributor, a perforated tape adapted to control the transmission of code combinations of signals from said message transmitter, an auxiliary transmitter having an operating cycle in which a plurality of code combinations of signals are transmitted, means controlled by the transmission of signals representative of a predetermined number of predetermined perforations in said tape whereby the operation of said tape transmitter is halted simultaneously with the initiation of the operation of said auxiliary transmitter, the disconnecting of said tape transmitter from said distributor and the connecting of said auxiliary transmitter thereto, means whereby said auxiliary transmitter then operates through one cycle of operation and means operative thereafter to return said mechanisms to normal, and means for varying the signals transmitted from said auxiliary transmitter.

49. In combination, a distributor, a telegraph tape transmitter normally connected to said distributor, an associated perforated tape, an auxiliary transmitter, means controlled by the transmission of signals representative of predetermined perforations in said tape whereby the operation of said tape transmitter is halted simultaneously with the initiation of the operation of said auxiliary transmitter, the disconnecting of said tape transmitter from said distributor and the connecting of said auxiliary transmitter thereto, means operative thereafter whereby said auxiliary transmitter transmits to said distributor a predetermined number of signals, means to then disconnect said auxiliary transmitter from said distributor and reconnect said tape transmitter thereto and means for rendering either of said transmitters inoperative during the operation of the other.

50. In combination, a sending circuit, a perforated tape, the perforations in which represent a plurality of messages separated by a plurality of predetermined perforations, a tape transmitter for said tape normally connected to said sending circuit having an operating cycle the length of which is determined by the interval between said predetermined perforations in said tape, an auxiliary transmitter having an operating cycle in which a predetermined number of code combinations are transmitted, said signals comprising in part representations of numerals, and means controlled by said predetermined perforations in said tape whereby said transmitters are sequentially and intermittently connected to said sending circuit, for intervals equal to their respective operating cycles, means for rendering either of said transmitters inoperative while the other is operative and means for automatically varying the part of the signals from said auxiliary transmitter comprising numerals in consecutive numerical order for consecutive cycles of operation thereof.

51. In combination, a tape transmitter, a distributor, an auxiliary transmitter normally connected to said distributor having an operating cycle in which a plurality of signals are transmitted, manually controlled means to initiate the operation of said auxiliary transmitter, means controlled by said auxiliary transmitter at the end of a cycle of operation thereof to stop and disconnect the same from said distributor and connect said tape transmitter to said distributor and initiate the operation thereof and means controlled by the first mentioned means to stop the operation of said tape transmitter.

52. In combination, a sending circuit, a perforated tape, a normally inoperative tape transmitter comprising means for distributing to said sending circuit code combinations of impulses representative of perforations in said tape, an auxiliary transmitter normally connected to said sending circuit having an operating cycle in which a predetermined number of signals are transmitted to said sending circuit, a multiple conductor plug and associated multiple conductor jack, means operative on the insertion of said plug in said jack to initiate the operation of said auxiliary transmitter for one cycle of operation, means operative by said auxiliary transmitter to stop and disconnect the same from said sending circuit after one cycle of operation and simultaneously connect said tape transmitter to said sending circuit and render the same operative to transmit code combinations of signals representative of perforations in said tape, means operative on the removal of said plug from said jack to restore the transmitters to normal, means for rendering either of said transmitters inoperative during the operation of the other and means for automatically changing a predetermined portion of the signals of said auxiliary transmitter whereby said signals representing numerals vary in consecutive numerical order for consecutive cycles of operation thereof.

53. In a telegraph transmitting mechanism, a normally rotating shaft, a cam sleeve on said shaft and adapted to be driven therefrom, a plurality of current controlling contacts and an associated group of contact levers adapted to be sequentially operated by said cam sleeve to actuate said contacts, a first code drum adapted to be intermittently rotated a part of a revolution for every revolution of said cam sleeve, a second code drum adapted to be intermittently rotated a part of a revolution for every revolution of said first code drum, a third code drum adapted to be intermittently rotated a part of a revolution for every revolution of said second code drum, contact groups associated with each of said code drums, means to connect said contact groups to said transmitting contacts in a predetermined order, manually operated means to initiate the operation of said cam sleeve and means operated by said first drum to automatically stop the rotation of said cam sleeve after a predetermined number of revolutions.

54. In a telegraph mechanism having an operating cycle in which a plurality of groups of code combinations of electrical impulses of the start-stop variety are transmitted for each cycle of operation, a distributor mechanism comprising a plurality of transmitting contacts and means for actuating said transmitting contacts in cyclic order, other contacts coacting with said transmitting contacts to set up code combinations in said transmitting contacts, means to transmit synchronizing impulses accompanying each group of code impulses and means for actuating said other contacts in a predetermined arrangement during the transmission of said synchronizing impulses.

55. In an impulse transmitting apparatus having an operating cycle in which a plurality of code combinations of impulses are transmitted, a distributor mechanism comprising a set of transmitting contacts, a plurality of groups of secondary contacts, means embodying a group of rotatable members whereby one group of said secondary contacts are actuated a plurality of times for each cycle of operation whereby another group of said secondary contacts are actuated once for each cycle of operation and whereby still another group of said secondary contacts are actuated once for a plurality of cycles of operation of said apparatus and automatic means for stopping said apparatus after each cycle of operation.

56. In a telegraph apparatus for transmitting a predetermined number of code combinations of impulses representative of printer functions and figure characters, means whereby impulses representative of said printer functions are retransmitted for every operation of said apparatus and means whereby said impulses representative of said figures characters are automatically varied in consecutive numerical order for consecutive operations of said apparatus.

57. In a telegraph transmitter, a rotating shaft, a first rotatable member and a plurality of secondary rotatable members adapted to be frictionally rotated from said shaft, a plurality of groups of contacts associated with said rotatable members, means controlled by the rotation of said rotatable members to actuate said contacts in a predetermined order, manually controlled means for releasing said first rotatable member and means controlled by said first rotatable member for releasing said secondary rotatable members in a predetermined sequence and in a predetermined time relationship.

58. In combination, a distributor, a distributor mechanism, a control means, a transmitting mechanism comprising a series of rotatable drums, groups of contacts associated with said drums, means for setting up in said contact groups signals of predetermined character and means coacting with said control means whereby said contact groups are connected to said distributor in a predetermined sequence and in timed relation to the operation of said distributor mechanism.

59. In combination, a telegraph distributor, an auxiliary distributor comprising an operating cam with a plurality of groups of associated contacts, a plurality of secondary cams with associated contact groups, means to initiate the operation of said operating cam, means controlled by said operating cam whereby said associated contact groups and said groups associated with said secondary cams are connected to said distributor in a predetermined order, means to stop the operation of said operating cam after one cycle of operation and means embodying said secondary cams whereby said associated contacts are actuated in a prearranged manner.

60. In a telegraph transmitter having an operating cycle in which a definite number of signals comprising continuous succession of groups of solely character selecting conditions are transmitted, means for varying a portion of said character selecting conditions according to a predetermined arrangement concomitantly with every cycle of operation thereof, automatic means embodying a perforated tape to initiate the operation of said transmitter for one cycle of operation and automatic means to stop the operation of said transmitter at the completion of every operating cycle.

61. In combination, a sending circuit, a telegraph transmitter having a plurality of rotatable drums, a plurality of groups of contacts associated with said drums, a series of pins predeterminedly arranged in axial rows on said drums to actuate said contacts, means to intermittently position according to a predetermined arrangement said drums to bring successive rows of pins into operative relation with said associated contacts and means controlled by the positions of said drums to connect said contact groups to said sending circuit in a predetermined manner.

62. In a telegraph transmitter for transmitting message groups of code combinations of impulses, means for automatically appending code combinations of impulses to said message groups and means automatically operated whereby a portion of said appended impulses representing numerals are varied in consecutive numerical order.

63. In a telegraph system, a sending circuit terminating in a jack, a message transmitter for transmitting message groups of signals, a normally inoperative auxiliary transmitter associated with said sending circuit and having an operating cycle in which a definite number of signal groups are transmitted to said sending circuit, means including a plug for operatively associating said message transmitter with said sending circuit to transmit a message group of signals and means operative concomitantly with said last mentioned means for rendering said auxiliary transmitter operative whereby each message group of signals transmitted to said sending circuit by said message transmitter is automatically accompanied by a group of a definite number of signals transmitted by said auxiliary transmitter.

64. In a telegraph system, a sending circuit terminating at a jack, a message transmitter for transmitting message groups of signals, a normally inoperative auxiliary transmitter associated with said sending circuit and having an operating cycle in which a definite number of signal groups are transmitted to said sending circuit, means including a plug for operatively associating said message transmitter with said sending circuit to transmit a message group of signals, means operative concomitantly with said last mentioned means for rendering said auxiliary transmitter operative whereby each message group of signals transmitted to said sending circuit by said message transmitter is automatically accompanied by a group of a definite number of signals transmitted by said auxiliary transmitter and means operative concomitantly with the operation of said auxiliary transmitter to automatically vary the signals transmitted thereby in accordance with a predetermined plan.

65. In a telegraph system, a sending circuit, a plurality of message transmitters for transmitting message groups of signals, a normally inoperative auxiliary transmitter associated with said sending circuit and having an operating cycle in which a definite number of signal groups are transmitted to said sending circuit, means for operatively associating said message transmitters one at a time with said sending circuit to transmit successive messages and means associated with said last mentioned means for cycling said auxiliary transmitter whereby predetermined messages transmitted to said sending circuit by said message transmitter are automatically accompanied by a group of a definite number of signals transmitted by said auxiliary transmitter.

66. In a telegraph system, a sending circuit, a plurality of message transmitters for transmitting message groups of signals, an auxiliary transmitter associated with said sending circuit and having an operating cycle in which a definite number of signal groups are transmitted to said sending circuit, means for operatively associating said message transmitters one at a time with said sending circuit to transmit successive message groups, means associated with said last mentioned means for cycling said auxiliary transmitter whereby predetermined message groups of signals transmitted to said sending circuit by said message transmitter are automatically accompanied by a group of a definite number of signals transmitted by said auxiliary transmitter and means operative concomitantly with the operation of said auxiliary transmitter to automatically vary the signals transmitted thereby in accordance with a predetermined plan.

67. In a telegraph system, a sending circuit, a message transmitter, an auxiliary transmitter having an operating cycle in which a predetermined number of code combinations of signals are transmitted, means for connecting the message transmitter to said sending circut and means controlled by such connection to render said auxiliary transmitter operative to transmit over the sending circuit whereby service signals from said auxiliary transmitter accompany each message from the message transmitter.

68. In a telegraphy system, a sending circuit terminating in a jack, a message transmitter connected to a plug adapted to be inserted in said jack, an auxiliary transmitter having an operating cycle in which a predetermined number of code combinations of signals are transmitted, said auxiliary transmitter being operatively associated with said sending circuit and means responsive to the insertion of said plug in the jack for rendering said auxiliary transmitter operative to transmit to said sending circuit.

ROBERT F. DIRKES.
RAY HOOVER.
EVAN R. WHEELER.